US008949815B2

(12) United States Patent
Phaedrus et al.

(10) Patent No.: US 8,949,815 B2
(45) Date of Patent: Feb. 3, 2015

(54) DRIVER INSTALLATION FOR TARGETED AND NON-PRESENT DEVICES

(71) Applicant: Microsoft Corporation, Redmond, WA (US)

(72) Inventors: Mark Henriksen Phaedrus, Kenmore, WA (US); Faisal Ansari, Redmond, WA (US); Jordan Cohen, Redmond, WA (US); James Cavalaris, Redmond, WA (US); Adam Lenart, Redmond, WA (US); Ullattil Shaji, Redmond, WA (US); Rajiv Poonamalli, Redmond, WA (US); Sharad Goel, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/907,069

(22) Filed: May 31, 2013

(65) Prior Publication Data

US 2014/0359592 A1    Dec. 4, 2014

(51) Int. Cl.
*G06F 9/44* (2006.01)
*G06F 13/10* (2006.01)
*G06F 9/445* (2006.01)

(52) U.S. Cl.
CPC ............... *G06F 8/65* (2013.01); *G06F 9/4411* (2013.01); *G06F 13/102* (2013.01)
USPC ........... 717/168; 717/171; 717/172; 717/173; 719/321; 719/327

(58) Field of Classification Search
CPC .................................................... G06F 13/102
USPC .................................................. 719/321, 327
See application file for complete search history.

(56) References Cited

U.S. PATENT DOCUMENTS

| 6,904,592 | B1 | 6/2005 | Johnson |
| 6,931,523 | B1 | 8/2005 | Tomoson et al. |
| 7,000,228 | B2 | 2/2006 | Mortazavi |
| 7,062,765 | B1 | 6/2006 | Pitzel et al. |
| 7,743,374 | B2 * | 6/2010 | Machida ...................... 717/176 |
| 8,208,152 | B2 | 6/2012 | Hanson et al. |

(Continued)

FOREIGN PATENT DOCUMENTS

EP    1528751 A2    5/2005

OTHER PUBLICATIONS

Microsoft Developer Network, "Preinstalling a PnP Function Driver Package" (Oct. 3, 2008), pp. 1-2 [retrieved from http://web.archive.org/web/20081003065905/http://msdn.microsoft.com/en-us/library/ms790278.aspx].*

(Continued)

*Primary Examiner* — Brian W Wathen
(74) *Attorney, Agent, or Firm* — Bryan Webster; Kate Drakos; Micky Minhas

(57) ABSTRACT

A computer-implemented method for managing device drivers includes requesting a device driver update set for a plurality of devices connectable to a computing device. The method also includes receiving the device driver update set, installing each driver of the device driver update set on the computing device. At least one updated driver in the update set is an updated driver for a device that is disconnected from the computing device at the time of the request. The method further includes configuring the at least one updated driver for the non-connected to activate when the device is detected by the computing device.

20 Claims, 14 Drawing Sheets

(56) References Cited

U.S. PATENT DOCUMENTS

| | | | |
|---|---|---|---|
| 8,555,273 B1 | 10/2013 | Chia et al. | |
| 2002/0129353 A1 | 9/2002 | Williams et al. | |
| 2003/0195951 A1* | 10/2003 | Wittel et al. | 709/220 |
| 2003/0229890 A1 | 12/2003 | Lau et al. | |
| 2005/0091651 A1* | 4/2005 | Curtis et al. | 717/168 |
| 2005/0268295 A1 | 12/2005 | Amodio et al. | |
| 2006/0184927 A1 | 8/2006 | Deblaquiere et al. | |
| 2006/0218545 A1 | 9/2006 | Taguchi | |
| 2007/0169101 A1 | 7/2007 | Konersmann et al. | |
| 2007/0180445 A1* | 8/2007 | Greeff | 717/174 |
| 2008/0098094 A1* | 4/2008 | Finkelstein et al. | 709/220 |
| 2008/0244555 A1 | 10/2008 | Welvaert et al. | |
| 2009/0307680 A1* | 12/2009 | Trufinescu et al. | 717/170 |
| 2011/0035738 A1 | 2/2011 | Toeroe et al. | |
| 2011/0145805 A1 | 6/2011 | Taylor et al. | |
| 2011/0179080 A1 | 7/2011 | Miyazaki et al. | |
| 2011/0252415 A1 | 10/2011 | Ricci | |
| 2012/0017208 A1 | 1/2012 | Lussier et al. | |
| 2012/0089973 A1 | 4/2012 | Bhat et al. | |
| 2012/0278796 A1* | 11/2012 | Sandlin et al. | 717/174 |
| 2014/0047426 A1 | 2/2014 | Raje et al. | |

OTHER PUBLICATIONS

Choudhary, A., "Automatically Updates Drivers in Windows 8" (May 23, 2012), pp. 1-5 [retrieved from http://www.c-sharpcorner.com/UploadFile/6cde20/automatically-updates-drivers-in-windows-8/].*

Microsoft, "Microsoft Announces Availability of Windows 8 Consumer Preview" (Feb. 29, 2012), pp. 1-2 [retrieved from http://www.microsoft.com/en-us/news/press/2012/feb12/02-29windows8cppraspx].*

"Automatically get Recommended Drivers and Updates for Your Hardware", Published on: Nov. 24, 2009, Available at: http://windows.microsoft.com/en-in/windows7/automatically-get-recommended-drivers-and-updates-for-your-hardware.

"Installing Device Drivers without the Device being Present", Published on: May 27, 2008, Available at: http://cmb-it.blogspot.in/2008/05/installing-device-drivers-without.html.

"Installing Device Drivers in Windows Vista", Published on: Jan. 19, 2011, Available at: http://searchenterprisedesktop.techtarget.com/feature/Installing-device-drivers-in-Windows-Vista.

"Driver Magician", Retrieved on: Apr. 12, 2013, Available at: http://www.drivermagician.com/.

Choudhary, Arun, "Automatically Updates Drivers in Windows 8", Published on: May 23, 2012, Available at: http://www.c-sharpcorner.com/UploadFile/6cde20/automatically-updates-drivers-in-windows-8/.

"Windows Update Services: Client-Server Protocol", Retrieved on: Apr. 19, 2013, Available at: http://download.microsoft.com/download/9/5/E/95EF66AF-9026-4BB0-A41D-A4F81802D92C/[MS-WUSP].pdf, 183 pgs.

Iftekharh, "All New Windows Server '8' Hyper V Component Architecture Poster", retrieved at <<http://blogs.technel.com/b/iftekhar/defaull.aspx?p=2/default.aspx>>, Retrieved Date: May 21, 2012, 49 pgs.

PCT International Search Report and Written Opinion in International Application PCT/US2013/060748, mailed Feb. 25, 2014, 10 pgs.

U.S. Appl. No. 13/571,849, Office Action mailed Feb. 13, 2014, 19 pgs.

U.S. Appl. No. 13/571,849, Amendment and Response filed May 13, 2014, 19 pgs.

U.S. Appl. No. 13/571,849, Office Action mailed Jul. 7, 2014, 23 pgs.

U.S. Appl. No. 13/571,849, Amendment and Response filed Oct. 7, 2014, 22 pgs.

* cited by examiner

700

RECEIVE, AS PART OF THE UPDATE SET, A DRIVER SUBSET INCLUDING TWO OR MORE DRIVERS AND INSTRUCTIONS TO INSTALL THE TWO OR MORE DRIVERS TOGETHER
602

RECEIVE AN UPDATED DISCONNECTED DEVICE DRIVER AS PART OF A SUBSET OF RELATED DEVICE DRIVERS ALONG WITH THE DISCONNECTED DEVICE DRIVER
702

RECEIVE A SET OF UPDATED DRIVERS, INCLUDING AT LEAST ONE DRIVER FOR A DEVICE THAT IS DISCONNECTED FROM THE COMPUTING DEVICE AT THE TIME OF THE REQUEST
204

RECEIVE, WITH THE UPDATE SET, AT LEAST ONE NEW DRIVER FOR A DEVICE THAT HAS NOT PREVIOUSLY BEEN CONNECTED TO THE COMPUTING DEVICE AND AN INDICATION TO INSTALL THE AT LEAST ONE NEW DRIVER
802

FIGURE 8

DRIVER INSTALLATION FOR TARGETED AND NON-PRESENT DEVICES

BACKGROUND

Computing devices typically include various functionalities that can be updated from time to time. For example, a component device of a computing device (e.g., a graphics card, a data storage device, an input device, and so forth) can be associated with a device driver that enables the component device to function in the context of the computing device. A manufacturer or other entity associated with the component device can issue an update to the device driver, such as to fix a software bug, solve a compatibility issue, enhance functionality of the component device, and so on. The update can be installed on the computing device to replace or augment a previous version of the device driver.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Presented herein are techniques for installing or updating a component device driver that may improve the automatic initiation, performance, and/or completion of these processes. According to these techniques, when a driver or an update is available for a connectable device, the operating system may obtain and install the driver when the device is non-present (e.g., disconnected from a computing device). In some instances, the driver may be made available from a network-accessible update service that may be storing a driver for the device. The operating environment may also replace a current driver for a previously connected device with an updated driver while the device is disconnected from the computing device, or install a driver for a device that has not previously been connected to the computing device. In this manner, the operating environment may retrieve and drivers and updates for a device while economizing the attention of the user and improving a user experience when a component device is connected to a computing device.

In some embodiments, one or more methods for managing device drivers connectable to a computing device are contemplated. Methods may include, but not be limited to, requesting one or more drivers for one or more devices connectable to a computing device, and in response, receiving a driver update set. The driver update set may include one or more drivers for a device that is disconnected from the computing device at the time of the request. The methods may further include installing the driver for the disconnected device on the computing device and configuring the driver to activate when the disconnected device is detected by the computing device.

A computer-readable storage medium storing instructions for managing device drivers may be also provided. The instructions, when executed, may cause computing device to perform a method that includes requesting, from an update service, one or more drivers for one or more devices connectable to a computing device. Requesting a driver from an update service may include compiling a list of device drivers stored on the computing device. The list of drivers may include drivers for one or more devices that are disconnected from the computing device at the time of the request, drivers for one or more devices that have never been connected to the computing device, as well as driver version information for the drivers. One or more computing device attributes may also be determined and sent with the list of device drivers to the update service. In response, a device driver update set may be received, and may include at least one driver for disconnected devices. The method may also include installing the driver for the disconnected device on the computing device, and configuring the driver for the disconnected device to activate when the disconnected device is detected by the computing device.

One or more additional methods for managing device drivers are also contemplated. The methods may include, but not be limited to, receiving a request for device driver updates for one or more devices connectable to a computing device. Along with the request, a computing device system specification may be received. The system specification may include information regarding a driver for a disconnected device. The methods may compare the system specification to stored driver information and obtain a driver update set including a driver for the disconnected device. The methods may further determine whether a device driver is available for a device that has not previously been connected to the computing device. The determination may be based on computing device attributes included in the system specification. If a driver is available for a device that has not previously been connected to the computing device, the methods may add the driver to the update set and provide the update set to the computing device.

BRIEF DESCRIPTION OF THE DRAWINGS

The detailed description is described with reference to the accompanying figures. The use of the same reference numbers in different instances in the description and the figures may indicate similar or identical items.

FIG. 7 is an exemplary flow diagram that describes a method in accordance with one or more embodiments.

FIG. 8 is an exemplary flow diagram that describes a method in accordance with one or more embodiments.

DETAILED DESCRIPTION

Figure 1A:
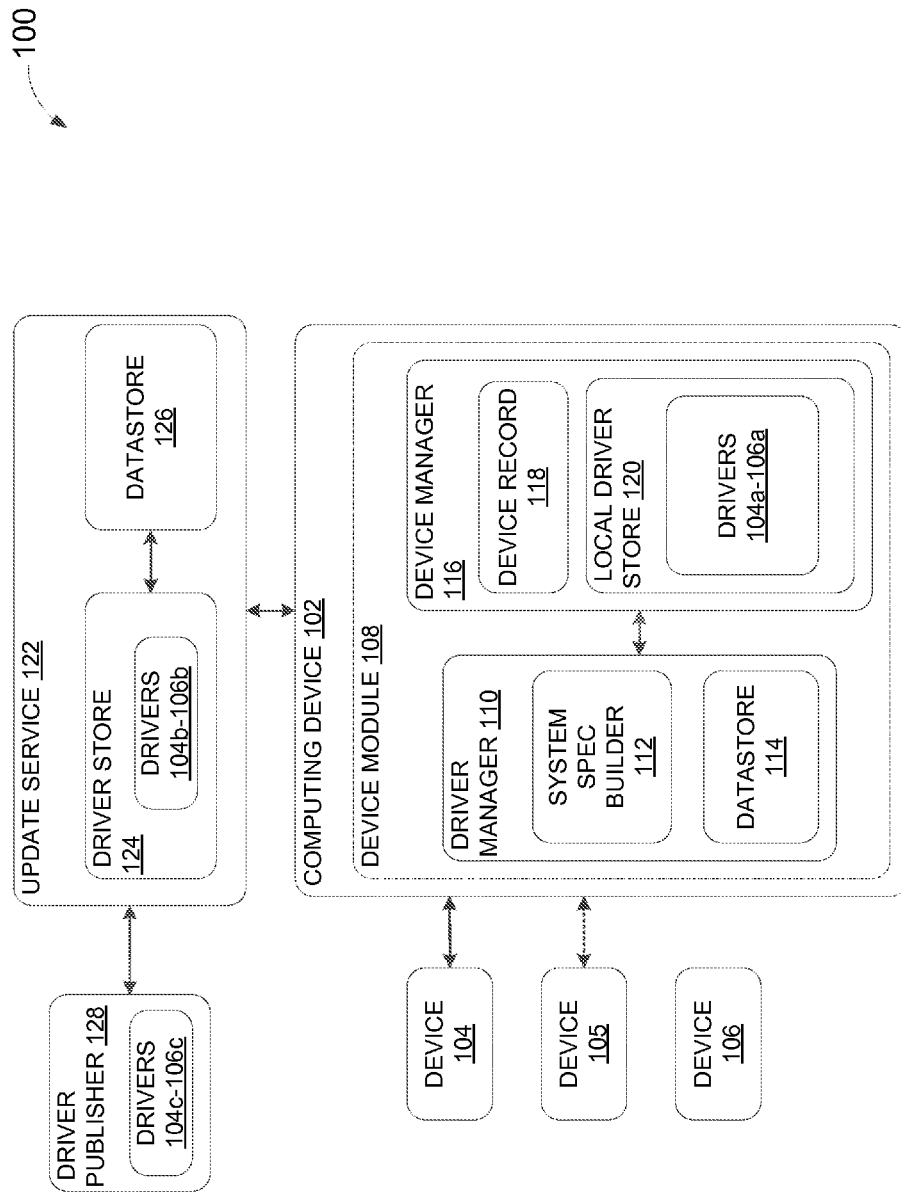
FIG. 1A is an illustration of an example environment that is operable to employ the techniques discussed herein.

Embodiments of the present disclosure provide techniques for managing the device drivers of component devices connectable to a computing device. Implementations of the present disclosure provide seamless installation and updating of drivers on a computing device. Drivers and updates may be provided by, among others, an online service, third party server, driver vendor server or operating system vendor server. Within the field of computing, many scenarios involve a component device attached to a computing device, such as a computer, through various types of wired and/or wireless connections. For example, a typical computing device can utilize devices such as keyboards, mice, display devices sound cards, bus controllers, video capture devices such as digital cameras, speakers, display adapters, sound adapters, storage devices, network adapters, microphones, universal serial bus devices, Firewire controllers and devices, DVD drives, network cards, DSL modems, cable modems, monitors, printers, fax machines, scanners, and the like. In order to provide access to the capabilities of the component device, a software component, typically referred to as a driver, may be installed on the computer as an interface with which applications and the operating environment may interact to operate the component device. For example, the software may accept input to the component device (e.g., the invocation of capabilities or the transmission of data) requested by an application or the operating environment and may relay that data to the component device. The software may also enable output from the component device (e.g., status reports, user input received from a user input device, or video captured by a camera) to be exposed or provided to various applications and/or the operating environment. The software may configure the component device to interoperate with other devices, and may mediate the installation of the component device in the operating environment (such as an operating system) and/or the uninstallation of the device from the operating environment.

In view of the range of available drivers for a device, an operating environment may be configured to manage the installation of a driver for the device in many ways. Typically, a driver is added to the system, for example, whenever a user adds a new piece of hardware to a machine. For instance, a user may provide a driver while installing a device, e.g., by providing removable media packaged with the device that contains an installation package for the driver. Alternatively, when a device is first connected to the computer, the operating environment may perform a sequence of searches and choices in order to identify a driver to be installed. In some embodiments, the operating environment may request a driver for the device from a driver library or service that is accessible over a network such as the Internet or a local area network (LAN), may receive the driver over the network, and may install the driver within the operating environment. In some instances, the operating environment may receive the driver directly from the device, which may store its driver and may be capable of providing the driver to the operating environment during installation while no such driver is currently installed (e.g., using plug-and-play (PnP) technology). Generally, PnP is a methodology that facilitates the recognition and identification of a hardware device that is plugged into a system, so as to facilitate automatic installation and configuration of the device within the operating system. In other instances, the operating environment may have been pre-loaded with a driver for the device or may include a default driver set, comprising default drivers for general classes of device. A driver may also be updated to fix problems/bugs in the driver, add performance and/or add additional device features. However, device drivers are typically only updated when the devices are connected to a computing device.

As discussed herein, drivers may be managed for various component devices. Systems and methods of the present disclosure may incorporate a client/server infrastructure that allows support of a component device regardless of whether the component device is connected to a computing device. Specifically, embodiments of the disclosure provide the ability of an operating environment to detect, download, and install drivers for devices that have previously been connected to a computer, or have never been connected to a computer, even if those devices are not connected to the computer at the time of the detection, download, and/or installation of the driver or update. For instance, the operating environment may be configured to check for updates to drivers after installation to replace a current driver with an updated driver, or to check for drivers for devices that have not previously been connected to the computing device (e.g., because the devices are newly released products that are known to be connectable to the computing device). In some instances, an update set including one or more drivers and/or driver updates may be available from an external source (e.g., manufacturer, update service, etc.) through a network connection. To prevent a delay in use or failure when a device needing a driver is connected, the operating environment may be configured to retrieve the drivers when a network connection is available, store retrieved drivers until a corresponding device is connected, and activate the driver upon connection of the device. As used herein, "connected" includes devices that are communicatively connected, regardless of whether a physical connection exists.

In the following discussion, an example operating environment and example implementation scenarios are described that are operable to employ the techniques described herein. Example procedures involving techniques discussed herein are also described which may be employed in the example environment as well as in other environments. Particularly, while the present disclosure is described with reference to a client and server configuration, the systems and methods of the present disclosure may be applicable to communications between any two or more computing environments, and such communication should be considered within the scope of the present disclosure. In particular, the present disclosure may also be applicable to mobile and wireless devices where traditional driver delivery mechanisms to support new or updated drivers are cumbersome. The particular embodiments described herein are intended in all respects to be illustrative rather than restrictive. Alternative embodiments will become apparent to those skilled in the art to which the present disclosure pertains without departing from its scope. Accordingly, the example environments are not limited to performing the example procedures. Likewise, the example procedures are not limited to implementation in the example environment.

Figure 1B:
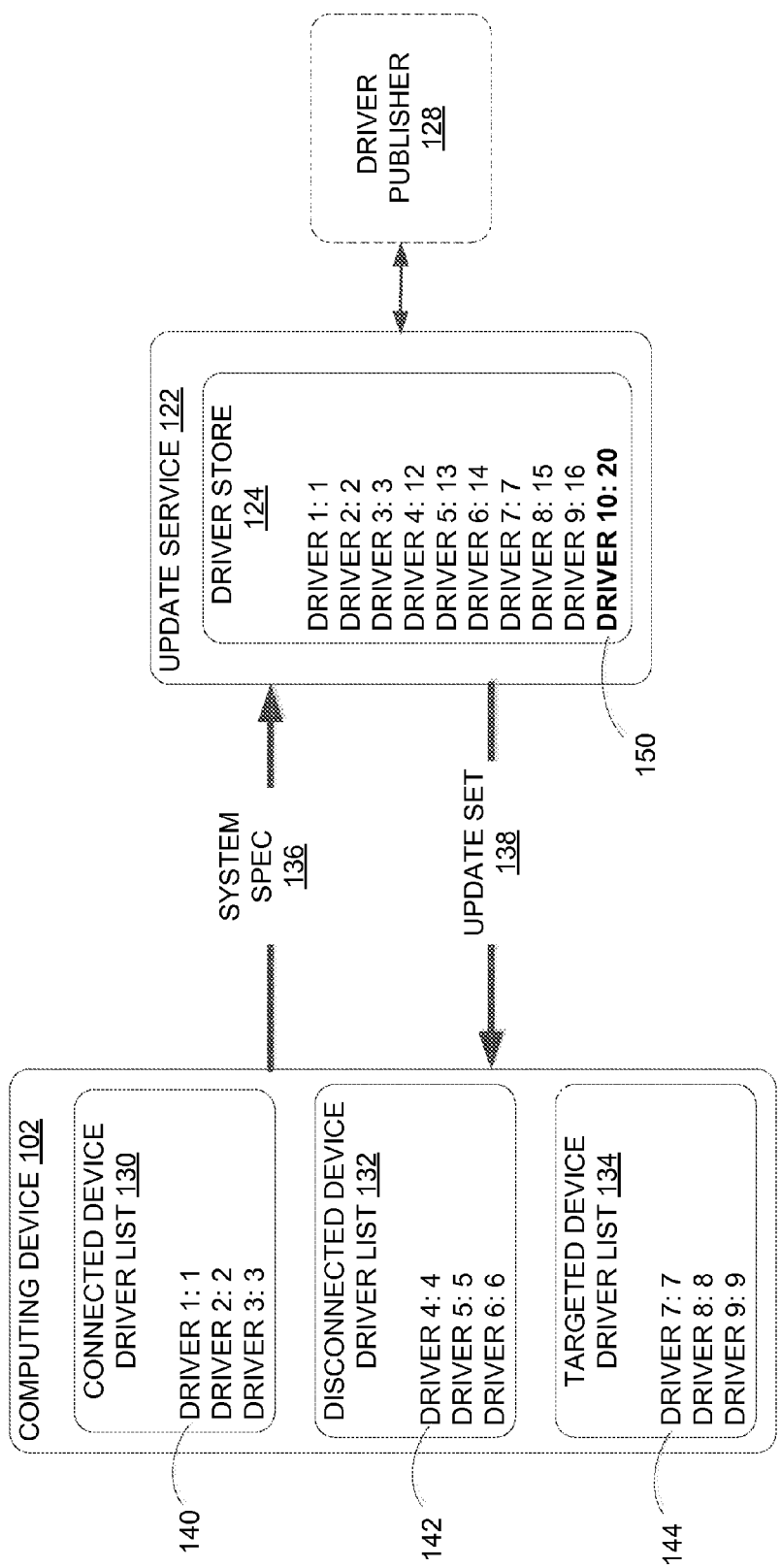
FIG. 1B is an additional illustration of an example environment that is operable to employ the techniques discussed herein

FIG. 1A depicts an example environment 100 that is operable to provide techniques for managing device drivers discussed herein. FIG. 1B further depicts a portion of the environment 100 shown in FIG. 1A, and will be described in greater detail below. The environment 100 generally includes a computing device 102 connectable to an update service 122. The computing device 102 may be embodied as any suitable computing device such as, by way of example and not limitation, a desktop computer, a portable computer (e.g., a laptop), mobile phone, tablet computer, and so forth. One of a variety of different examples of a computing device 102 is shown and described below in FIG. 16. The computing device 102 may be configured to inspect its operating environment to determine whether new or updated device drivers are needed. If a new or updated driver for a specific device is not available within the operating environment, the computing device 102 may be configured to communicate with the update service 122 to obtain a set of updated drivers and/or new drivers. The set of drivers obtained from the update service 122 may include one or more drivers for a device that is not connected to the computing device 102 at the time of inspection, and/or one or more drivers for a device that has not previously been connected to the computing device 102.

The computing device 102 may also be configured to receive or interoperate with one or more component devices 104, 105, and 106 (hereinafter referred to as devices 104-106). The devices 104-106 may be capable of being plugged into and recognized by, for instance, computing device 112, while the computing device 102 is on and operating. In some embodiments, the device module 108 of the computing device 102 may perform one or more operations to provide device recognition, including identifying the device and associated device information. Identification of a device may include gathering of other information including whether or not a driver is currently available on the computing device 102 along with any information regarding existing drivers for the device. The identified information may be passed to the driver manager 110 for storage in the datastore 114. In some instances, the devices 104-106 may be connected by a user or installed by a manufacturer. The computing device 102 may also include a device module 108 configured to manage the devices 104-106 and their respective drivers. To this end, computing device 102 may also include, within the device module 108, a driver manager 110 configured to maintain drivers and updates for connectable devices (e.g., devices 104-106). The driver manager 110 may be configured to manage driver operations (including updates) for the computing device 102. For instance, the driver manager 110 may enable a driver (e.g., device drivers 104a-106a) to be retrieved (e.g., downloaded from a network resource) and installed on the computing device 102. The driver manager 110 may further include a system specification builder 112 and a datastore 114, which are discussed in greater detail below.

The computing device 102 may also include, within the device module 108, a device manager 116 configured to manage one or more connectable devices (e.g., devices 104-106). The device manager 116 may be a utility that is used by a user or other functions on the computing device 102. Specifically, the device manager 116 may be configured to manage hardware components connectable to the computing device 102 (such as devices 104-106). In some instances, the device manager 116 is a plug-and-play (PnP) utility that enables the automated identification of devices that are installed in a computing device 102. The devices may be currently connected (e.g., device 104), previously connected, but currently disconnected devices (e.g., 105) and/or devices that have not previously been connected, but are connectable to the computing device 102 (e.g., device 106, referred to herein as a targeted device). The device manager 116 may further include a device record 118 and a local driver store 120. The local driver store 120 may be configured to store a plurality of device drivers 104a, 105a, and 106a (hereinafter 104a-106a) corresponding to devices 104-106, respectively. Device drivers 104a-106a may be device drivers supplied with the computing device 102 or with the device manager 116 (e.g., "initial device drivers"), or may be device drivers obtained from other sources at a later time (e.g., "updated device drivers"). As illustrated, the computing device 102 may be configured to store device drivers for devices in any state described above (e.g., currently connected, previously connected, never-connected, etc.).

Further to embodiments of the disclosure, the computing device 102 may be configured to communicate with the update service 122 via a network. The update service 122 may be representative of an external functionality for managing drivers for a variety of different computing devices (e.g., including the computing device 102), and may enable the drivers and updates to be provided to the computing devices. The update service 122 may be implemented as a network resource, such as via a web server. The network may assume a wide variety of different configurations, such as the Internet, a wide area network (WAN), a local area network (LAN), a wireless network, a public telephone network, an intranet, and so on. The network may be configured to include multiple networks. While various entities of the environment may communicate via a network, a wide variety of different communication channels other than a network may be employed, such as to enable one group of entities to communicate via a different communication channel than another group. The update service 122 may further include a driver store 124 storing one or more drivers 104b-106b, and a datastore 126 storing, for instance, device information for devices related to drivers 104b-106b.

The computing device 102 and/or the update service 122 may configured to communicate with a driver publisher 128. The driver publisher 128 may be representative of an entity that can publish and/or manage various types of drivers and driver updates. Examples of the driver publisher 128 may include device manufacturers, such as a manufacturer of the computing device 102 and/or of component devices 104-106 connectable to the computing device 102. The driver publisher 128 may also include software developers and/or other entities that can develop and/or issue updates for various components and functionalities. For instance, the driver publisher 128 may include manufacturers and/or other entities associated with the component device 104. Other examples of the driver publisher 128 may include corporate administrators, contracted administrators, or other entities that are given the authority to specify and/or modify driver-related behaviors. Thus, the driver publisher 128 may publish and/or issue drivers for the component devices 104-106, such as drivers 104c-106c which may be sent to the computing device 102 or to the update service 122 (e.g., to replace drivers 104a-106a or drivers 104b-106b).

Alternative components (not shown) may include a user interface configured to engage a user in the selection and decision to download or install any drivers. An example of such a service may be a Graphical User Interface (GUI) utility program that enables a user to select a particular driver file to be updated. Such a utility may be implemented with the systems and methods of the present disclosure to provide information about the computing device to a server that may then match and identify and appropriate updated drivers.

The following discussion describes example procedures for installing and updating device drivers in accordance with one or more embodiments of the present disclosure. In portions of the following discussion, reference will be made to the environment 100 of FIGS. 1A and 1B. In at least some embodiments, aspects of the procedures may be implemented via one or more of the entities discussed above, such as computing device 102 (or one of the computing device components discussed above), the update service 122 and/or the driver publisher 128). However, references to specific components of FIGS. 1A and 1B are for illustrative purposes only, and do not limit the disclosure to the embodiments described herein. The processes described below are further illustrated in FIGS. 2-15, where aspects of the example embodiments are depicted in flow diagrams that describe one or more processes in accordance with one or more embodiments.

Figure 2:
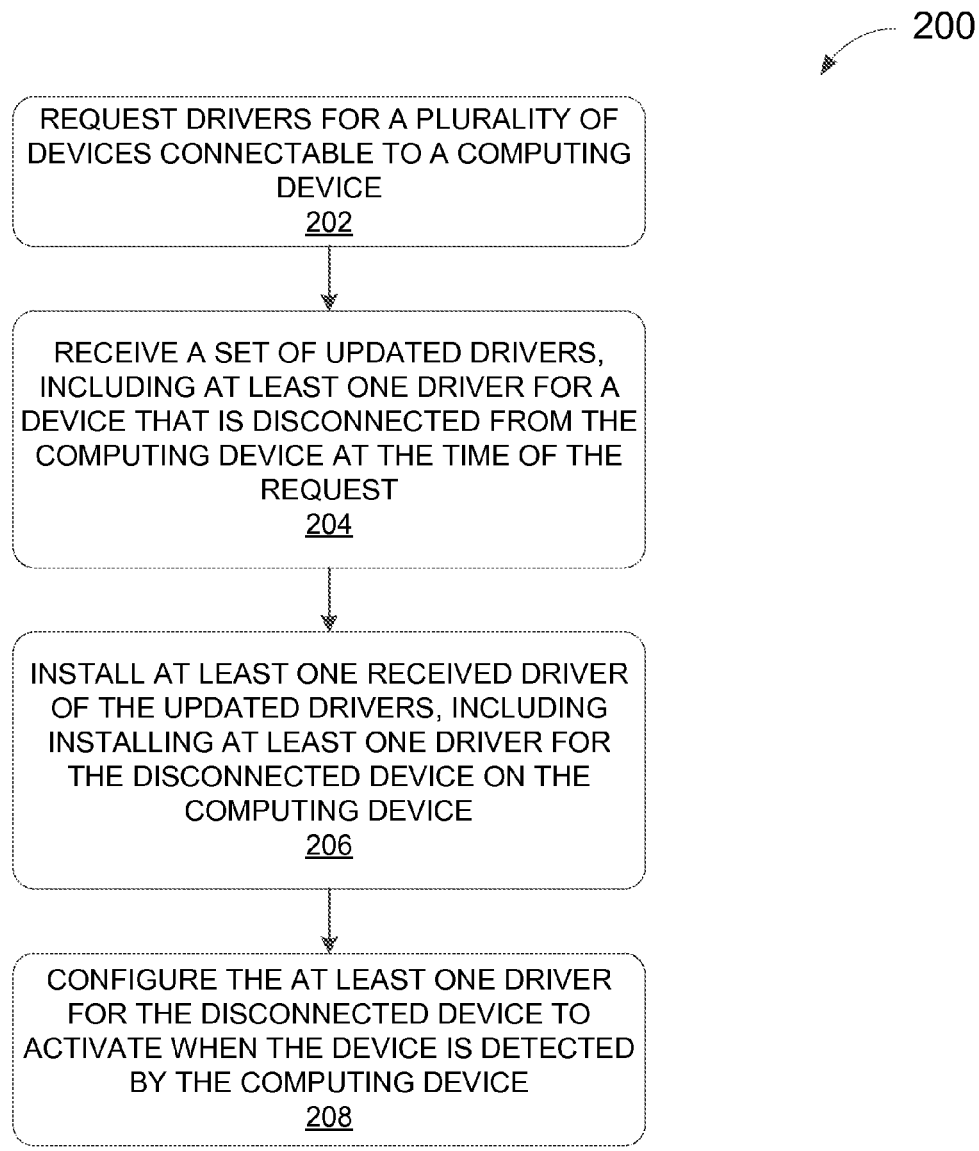
FIG. 2 is an exemplary flow diagram that describes a method in accordance with one or more embodiments.
Figure 3:
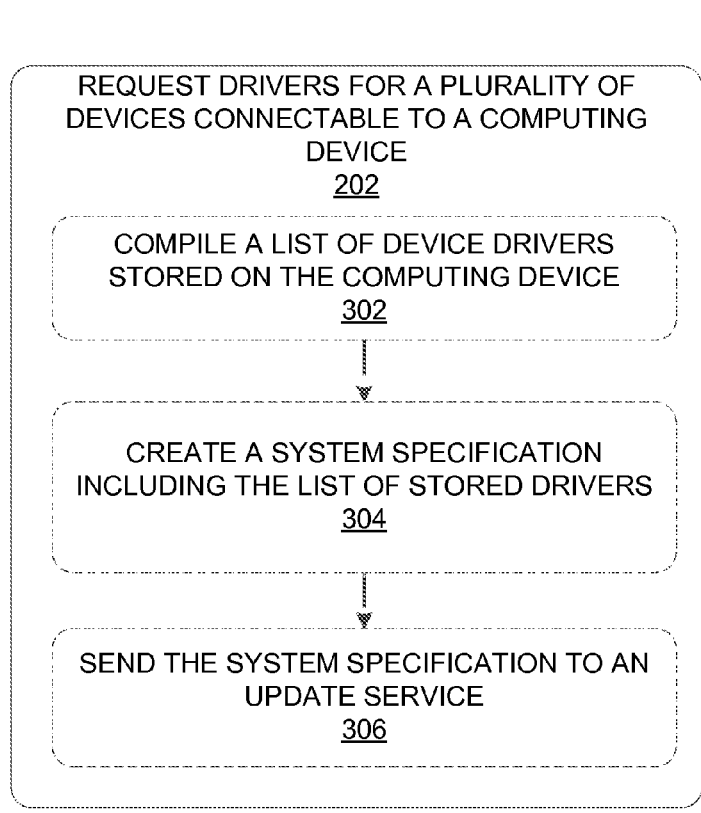
FIG. 3 is an exemplary flow diagram that describes a method in accordance with one or more embodiments.
Figure 4:
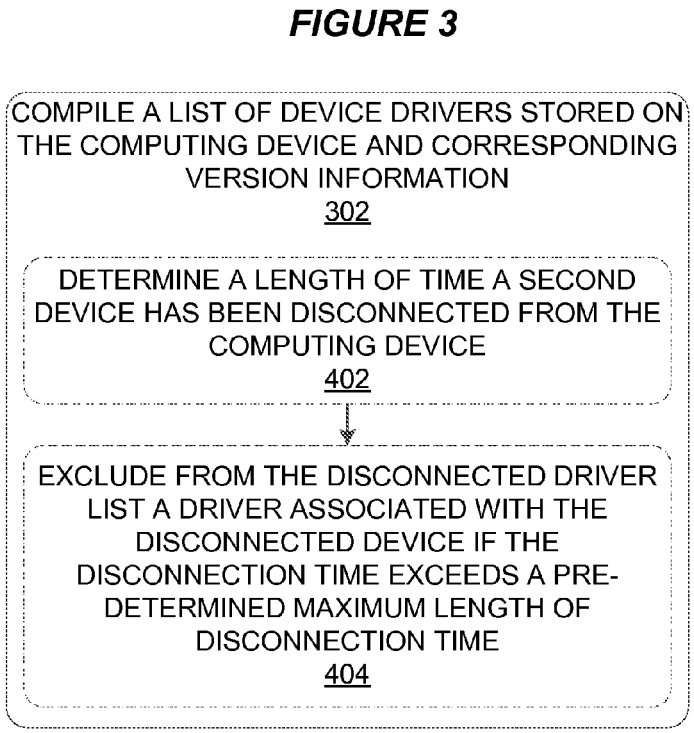
FIG. 4 is an exemplary flow diagram that describes a method in accordance with one or more embodiments.
Figure 5:
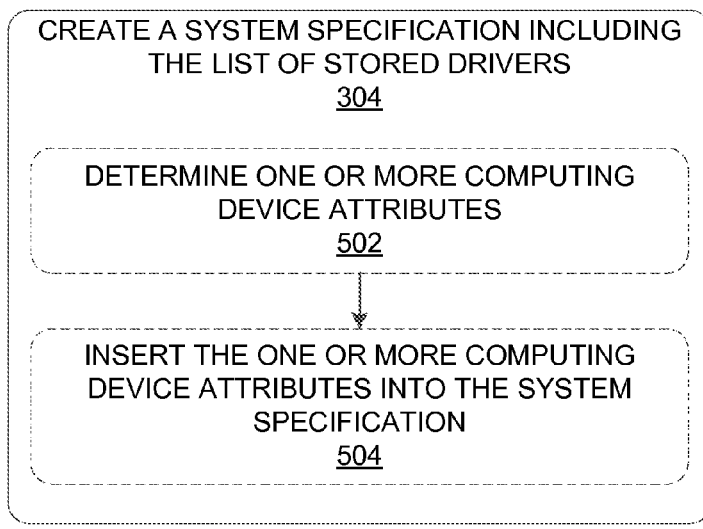
FIG. 5 is an exemplary flow diagram that describes a method in accordance with one or more embodiments.

An example embodiment is depicted in FIG. 2, where a method 200 for managing drivers is illustrated. Additional embodiments are depicted in FIG. 3-10, where methods 300, 400, 500, 600, 700, 800, 900, and 1000 provide additional and/or optional process operations relating to method 200.

The method may begin at operation 202, where a request for a device driver update set for a plurality of devices connectable to a computing device is made. For instance, a check for updates relating to one or more drivers for devices available on a computing device 102 may be initiated. In some embodiments, operation 202 of method 200 may further include operations 302, 304, and 306 of FIG. 3, which describe optional operations performed when updated drivers are requested in operation 202. At operation 302, a list of drivers stored on the computing device is compiled. To compile a driver list, a determination of the drivers that are currently installed on the computing device may 102 be performed. The computing device 102 may investigate a driver store and any hardware devices on the system to discover available drivers. In some instances, compiling a list of drivers may involve, e.g., querying a local driver store (e.g., a pool of drivers already downloaded and available on the computing device) to determine whether one or more of the drivers (e.g., drivers 104a-106a) is locally stored. For instance, the driver manager 110 may query the device manager 116 for driver information, and the device manager 116 may scan the local driver store 120 to obtain the driver information. Compiling one or more driver lists may be performed regardless of a device connection state (e.g., connected or disconnected). Specifically, the computing device 102 may compile a list of drivers for currently connect devices and/or previously connected devices that are disconnected at the time of the request and/or compilation of the list.

FIG. 1B further illustrates compiling one or more driver lists for devices in one or more connection states. As can be seen in FIG. 1B, the computing device 102 may compile a list of drivers for devices that are currently connected to the system (e.g., connected driver list 130) and/or a list of drivers for devices that have previously been connected to the system but are not currently connected (e.g., disconnected driver list 132). In additional embodiments, a list of drivers for targeted devices (e.g., drivers for devices that have not previously been connected the computing device but for which a driver is available, illustrated in FIG. 1B as targeted device driver list 134) may be compiled. With reference to FIG. 1B, the computing device may maintain a list of drivers already stored on computing device 102 for component devices (e.g., driver 7 144, which may correspond to device 106 of FIG. 1A) that have not previously been connected to the computing device. In some embodiments, to obtain a driver for a targeted device, a request including the system specification, a list of targeted devices known to the computing device, and/or stored targeted device drivers (gathered or retrieved from any available source) may be sent to the update service 122. Improved user experience may be achieved by allowing such targeted drivers to be preloaded for popular peripherals and enabling the never-connected device to be used when the user connects the device, even if the user is not connected to a network.

Referring back to FIG. 1B, the driver lists 130, 132, 134 may include a plurality of drivers (e.g., driver 1 140 of connected driver list 130, driver 4 142 of disconnected driver list 132, and/or and driver 7 144 of targeted driver list 134). The driver lists 130, 132, 134 may further include corresponding driver information (e.g., driver version number, publication date, unique identifying number, etc.). A driver may be assigned a unique identifying number (e.g., driver 1 140 is assigned the number "1," driver 4, 142 is assigned the number "4," and driver 7 144 is assigned the number "7"). The examples provided herein are simplified for ease of explanation. It is contemplated that any mechanism for assigning unique identifiers to device drivers stored on the computing device 102 may be utilized. In some instances, the identifying number may be assigned during update publication. The computing device 102 (e.g., via the driver manager 110) may obtain the identifying numbers of the drivers known to be in a computing device update set from a computing device datastore (e.g., datastore 114).

For each category of drivers, the driver manager 110 may instruct the device manager 116 to inspect the local driver store 120 to determine which, if any, drivers in the driver store 120 are a most appropriate (e.g., most current, most specific, etc.) device driver to be included in the list. In some embodiments, the driver manager 110 may also check other operating system components for available drivers. In further embodiments, a detection algorithm may be utilized to determine installed drivers. For example, such an algorithm may implement driver retrieval via an application program interface (API) in the operating environment. Irrespective of the specific techniques performed, a list of drivers for devices in each connection state may be obtained.

In some instances, a driver in the disconnected driver list 132 may correspond to a device that has been disconnected for more than a predetermined amount of time. The computing device 102 may interpret a lengthy disconnection time as an indication that the device may not ever be reconnected. In these instances, to avoid repeatedly downloading and installing drivers for a device that may not be reconnected, operation 302 may further include operations 402 and 404 of method 400, illustrated in FIG. 4. At operation 402, a length of time that a device has been disconnected is determined. If a disconnection period exceeds a determined amount of time, method 300 may proceed to operation 404, where the driver for the device is excluded from the compiled list of drivers. In some embodiments, when the driver manager 110 requests the device manager 116 to provide the list of devices that were previously connected but not currently connected, it may also evaluate the amount of time that has elapsed since each device was last present. If the amount of time that has elapsed exceeds a determined threshold, then the driver manager 110 may exclude the driver from the list of disconnected device drivers 132 prior to insertion of the disconnected device driver list 132 into the system specification. The computing device 102 may thus attempt to prevent the retrieval, download and/or installation of an updated driver for the device. In alternative embodiments, the computing device 102 may be further configured to provide a list of excluded device drivers to the update service 122. A list of excluded device drivers may include information regarding why the driver was excluded from the list (e.g., exceeded disconnection time).

Referring back to FIG. 3, upon compiling a list of device drivers stored on the computing device, method 300 may proceed to operation 304, where a system specification for the computing device is created. In some embodiments, upon gathering a list of stored drivers, the computing device 102 (e.g., via the device module 108) may then be configured to compile a system specification including the list. As used herein, a system specification may be generally defined as specification of a computing device environment, including installed devices, drivers, hardware configuration, and/or other system information. Creating a system specification at operation 304 may optionally include operations 502 and 504 of method 500 shown in FIG. 5. At operation 502, one or more computing device attributes may be determined Computing device attributes may include information such as a description of the operating system, spoken language, BIOS information, hardware configuration information, device information, etc. In additional embodiments, the computing device attributes may also include a list of known targeted devices. Upon determining the one or more computing device attributes, method 500 may proceed to operation 504, where the one or more computing device attributes are inserted into the system specification, along with the driver lists 130, 132, and 134. The system specification 136 may be generated according to a recognizable data structure. For instance, the system specification 136 may conform to a structure such as an XML schema. In some embodiments, the schema or other document format for holding the system specification information may be generated by the system specification builder 112.

Referring back to FIG. 3, when the system specification 136 for the computing device 102 is created, method 300 may proceed to operation 306, where the system specification is sent to the update service. For instance, referring back to FIG. 1B, the system specification 136 may be sent to the update service 122 to trigger a query of the update service for a better driver (e.g., a more recent driver, or a driver designed for this specific device rather than for a broader range of similar devices) for each driver in the compiled driver list. If a network connection is available, the computing device 102 may connect to the update service 122 to obtain an available update and information needed to download and install the update for connected drivers, previously connected disconnected drivers, and/or targeted drivers. Such information may be generally defined as an update set (e.g., update set 138 of FIG. 1B). The computing device 102 may make any connection to the update service 122 including, but not limited to, via the Internet, LAN, WAN, dial-up, other connection, or a combination of connections.

In some embodiments, the system specification 136 may be packaged for transmission to the update service 122. For instance, the packaging and transmission may be performed utilizing Simple Object Access Protocol (SOAP) industry standards. As is known in the art, SOAP is a lightweight protocol for the exchange of information in a decentralized, distributed environment. The SOAP protocol is based on XML and consists of: (1) an envelope that defines a framework for describing what is in a message and how to process it, (2) a set of encoding rules for expressing instances of application-defined data types, and (3) a convention for representing remote procedure calls and responses.

Referring back to FIG. 2, upon requesting driver updates, method 200 may proceed to operation 204, where a driver update set is received. As shown in FIG. 1B, if a more appropriate driver is available, then the computing device 102 may receive a response from the update service 122 that includes an update set 138. The received update set 138 may include a list of better (e.g., more current, more specific) drivers for devices that already have installed drivers, including updated drivers for devices that have been previously connected but are not connected at the time of the request and drivers for devices that have never previously been connected.

Figure 6:
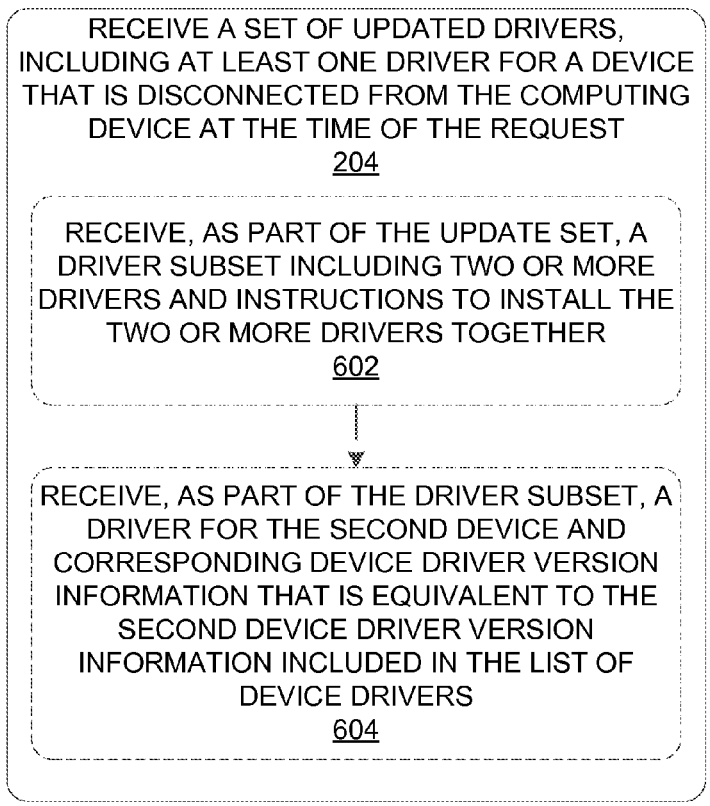
FIG. 6 is an exemplary flow diagram that describes a method in accordance with one or more embodiments.
Figure 9:
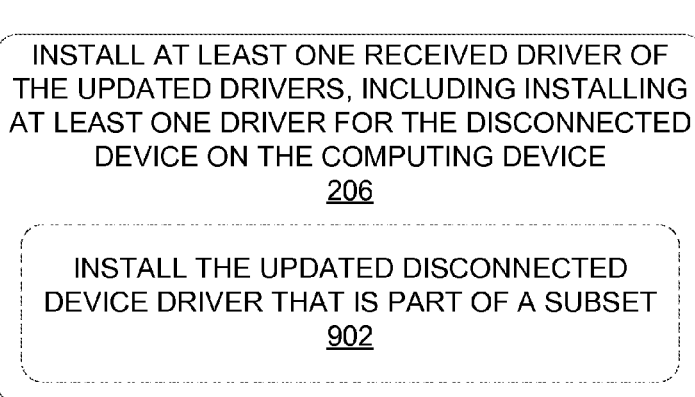
FIG. 9 is an exemplary flow diagram that describes a method in accordance with one or more embodiments.

Operation 204 may further include operations 602 and 604 of method 600, illustrated in FIG. 6. At operation 602, a driver subset may be received with the update set. Referring back to FIG. 1B, it is contemplated that drivers in a received update set 138 may be part of a collection of related drivers, or driver subset. Any or all of the received drivers may be marked as part of an update subset, meaning that the computing device may be directed to either install all of the updates in the subset or none of them. The computing device 102 may be configured to recognize that two or more drivers in the received update set 138 are related drivers. If an update set 138 contains a subset of related drivers the computing device 102 may be further configured to install the subset of drivers together, even if one or more of the related devices associated with the driver subset is not connected to the computer at the time of the detection, download, and/or installation. Update subsets are described in detail in application Ser. No. 13/571,849, entitled Aggregation of Update Sets, and filed Aug. 10, 2012, which is incorporated herein by reference. Operation 602 may optionally include operation 702 of method 700, illustrated in FIG. 7. At operation 702, an updated disconnected device driver may be received as part of a subset of related device drivers along with the disconnected device driver.

As described above, if an update is part of an update subset, the computing device 102 may receive, along with the drivers, instructions to install the update with remaining updates in the update subset. It is contemplated that one or more drivers received in an update subset may be the same driver stored on the computing device 102. Thus, in some embodiments, method 600 may proceed to operation 604, where, as part of the driver subset, a driver for a second device and corresponding device driver version information that is equivalent to second device driver version information included in the list of device drivers sent to the update service is received. If an equivalent received driver is included in an update subset, the computing device 102 may also receive instructions relating to the installation of the driver. The instructions may include that the driver is to be installed on the computing device 102. If the computing device 102 is unable to install the driver, the computing device 102 may receive instructions not to install any of the drivers in the update subset. An update subset may thus provide consistency when multiple drivers have dependencies on one another and at least one of the multiple drivers is disconnected at the time of a request for updated drivers.

Operation 204 may also optionally include operation 802 of method 800, illustrated in FIG. 8. At operation 802, at least one updated driver for a device that has not previously been connected to the computing device may be received. For instance, referring to FIG. 1B, the received update set 138 may also include at least one updated targeted driver (e.g., driver 9 of Driver Store 124). As indicated above, the computing device 102 may be enabled to receive drivers for a targeted device (a device not currently or previously connected). Thus, the received update set 138 may further include instructions for storing one or more targeted driver on the computing device.

Referring back to FIG. 2, when a driver update set is received, method 200 may proceed to operation 206, where the received drivers are installed on the computing device. For instance, a component of the computing device 102 may install the drivers. Drivers may be installed regardless of whether the corresponding device is connected (or has ever been connected) to the computing device 102.

In some embodiments, the driver manager 110 may utilize the update set information to display the list of available drivers to the user, who may then select the drivers to download and install. If the update set contains information on the location of a driver, that driver is downloaded and the associated driver files may be locally stored (e.g., into a local driver directory or store) for use by the device manager to install the drivers. If the driver is immediately needed to support the plugged-in device, an activation of the driver may be initiated by the device manager using the received update set information.

Referring back to FIG. 1B, the information received in the update set 138 may then be used to download one or more driver files (e.g., cabinet (CAB) device package files which include information files (INFs) for the applicable devices) and a system setup application program may be updated to utilize these download files. The computing device 102 (e.g., via the driver manager 110) may then determine whether to download and install the driver, for instance using automated rules or by obtaining user consent. For instance, the driver manager 110 may be configured to electively update the driver of an already installed device if the device is not connected to the computing device. Alternatively, a user may select a device that is already installed, but not presently connected, and elect to have the driver updated. Identification information for the selected device may be passed from the device manager 116 to the driver manager 110 in accordance with previously described methods of present disclosure. A user interface may engage the user in the selection and decision to download or install drivers located by the present disclosure.

The computing device 102 may be further configured to install one or more drivers as part of a subset of the update set. For instance, in some embodiments, operation 206 may further include operation 902 of method 900, illustrated in FIG. 9. At operation 902, an updated driver for a disconnected device may be installed as part of a subset of the update set, as described above.

The computing device 102 may also be further configured to receive instructions that one or more targeted device drivers are to be installed on the computing device 102. For instance, the computing device 102 may receive a response including information relating to any appropriate targeted device drivers. In some embodiments, if the computing device 102 includes a specified hardware configuration, one or more targeted device drivers may be configured to install even if the associated targeted device has not previously been connected to the computing device 102. A targeted driver installation designation may be assigned to a device driver at the time the update is published (e.g., to an update service), or may be assigned at a later time. In addition, the update may be designated for installation on computing devices including previously specified hardware configurations, and the drivers may be designated as part of the targeted set for those hardware configurations. For example, a driver publisher 128 may direct the update service 122 to push a set of targeted device drivers to any computing device 102 that has a particular hardware configuration or other system specification. In further embodiments, instructions may be received for storing the targeted device driver in the local store. The computing device 102 may determine whether to install the update (e.g., either through automated rules or through user consent), and if a targeted driver update is installed, the computing device 102 may store the targeted driver in a driver store.

Figure 10:
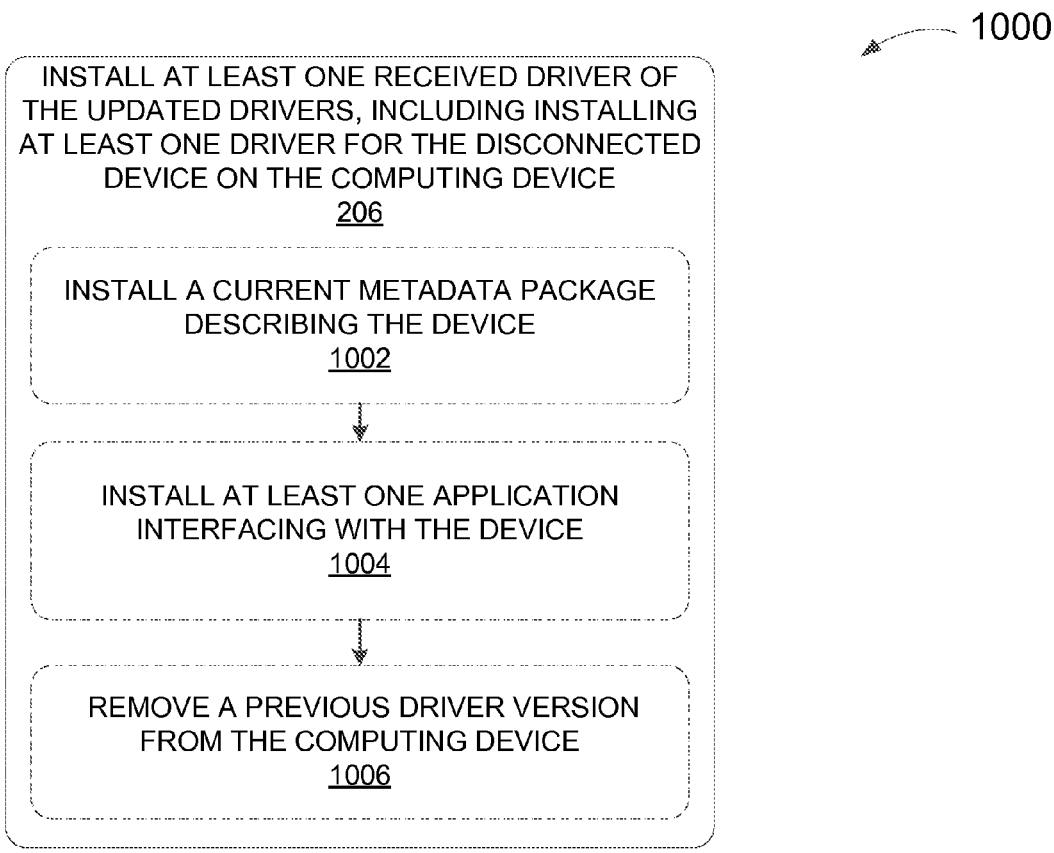
FIG. 10 is an exemplary flow diagram that describes a method in accordance with one or more embodiments.

It is contemplated that one or more additional operations may be performed upon initiation of a driver installation in operation 206. In other instances, a method 1000 for installing the driver is provided, as illustrated in FIG. 10. Method 1000 may begin with operation 1002, where a current metadata package for a corresponding device is installed. In some instances, the driver for a device may include a metadata package that describes the device, such as product information (e.g., a picture of the device, a purchase, activation, license, or warranty date relating to the device, or a model number, product number, or serial number identifying the device), a list of capabilities of the device, a list of functions that may be invoked by a user or an application with respect to the device, or product documentation. The metadata may also describe various characteristics of the update including its title, description, rules for determining if the update is applicable to a computer, and instructions for installing the update content. The metadata may be included with the driver (or may be associated with the driver), and in one such embodiment, this metadata package may be received and installed with the driver for the device. The metadata may also be stored for use in future update queries.

Method 1000 may further proceed to operation 1004, where at least one application interfacing with the device is installed. If appropriate, the computing device 102 may then download one or more the drivers from the update service 122 (e.g., download a driver payload). In some embodiments, the driver manager 110 may determine whether to download the received drivers. Based on the received metadata, the computing device 102 may obtain and/or install the appropriate drivers. It should be noted that the update set of information could also be utilized by a computing device application or utility to display information to a user. The displayed information could be the offer to download or install one or more drivers that are described in the received update set. If appropriate, the computing device 102 may then install the drivers received in the update set. For instance, the computing device 102 may instruct the driver manager 110 to install the drivers upon completion of the download, or at some designated time. In some embodiments the device manager 116 may receive instructions to store the installed drivers in a driver store for use by devices when connected. If the associated device is not connected at the time of download or installation, then the driver may be sent to a driver store (e.g., driver store 120), so that when the associated device is connected, the driver may be fetched from the driver store and activated by the device manager 116. In some embodiments, a driver installation failure may be provided. If a failure notification is received, a driver installation may be attempted at a later time or upon a restart of the computing device 102.

Method 1000 may then proceed to operation 1006, where a previous driver version for a device is removed upon installation of an updated driver. In some embodiments, an indication may be received that specifies that a particular update is to be removed from a set. For example, the computing device 102 may be notified by the update service 122 that the update is to be removed from the computing device. Upon receiving an updated driver for a device or a removal notification, the computing device 102 may uninstall a stored version of the driver and install the updated driver.

In some embodiments, an automatic update function (e.g., AutoUpdate) may perform one or more driver installation functions. For instance, the automatic update function may be configured to periodically update driver information on a computing device upon user acknowledgement. A user may elect to have an automatic update service activated on the computing device 102. As a result, an automatic update service may be similar to the device manager 116, and may automatically display a list of updates to a user. In some embodiments, the automatic update service may be a component of the device manager. In operation, the automatic update service may be activated by an event on the computing device 102. Information about the computing device 102 may then be collected. Computing device information may be passed to the update service 122. An update set may be returned to the automated updated utility. The automatic update service may utilize the update set information to provide a user with a list of drivers from which the user may then select one or more drivers for installation. For any drivers that are selected by the user, a download may be performed, and the device manager may then perform the installation.

Referring back to FIG. 2, upon installation of the received drivers, method 200 may then proceed to operation 208, where at least one received update for a disconnected device is configured for activation when the device is connected. The computing device 102 may configure one or more drivers for disconnected devices to activate when the device is reconnected (or connected for the first time) to the computing device 102. When a disconnected device is reconnected, or when a target device is connected for the first time, the driver for the device may be retrieved (e.g., from the driver store 120) and one or more operations may be performed by the computing device 102 to activate the driver for use. The ability to invalidate the state that binds an existing driver to a disconnected device such that the driver update must undergo activation upon the eventual reconnection of the device may be helpful in ensuring that the device is not started with the stale driver, even if only for a brief moment. For instance, if an updated driver contains a security fix, activating the driver upon reconnection may be useful to prevent malicious users from exploiting the state of the previous driver. If a security issue exists with a previous driver, allowing a security update to target disconnected devices may enable the computing device 102 a measure of protection from potential threats that may otherwise occur after the initial driver update is deployed.

Figure 11:
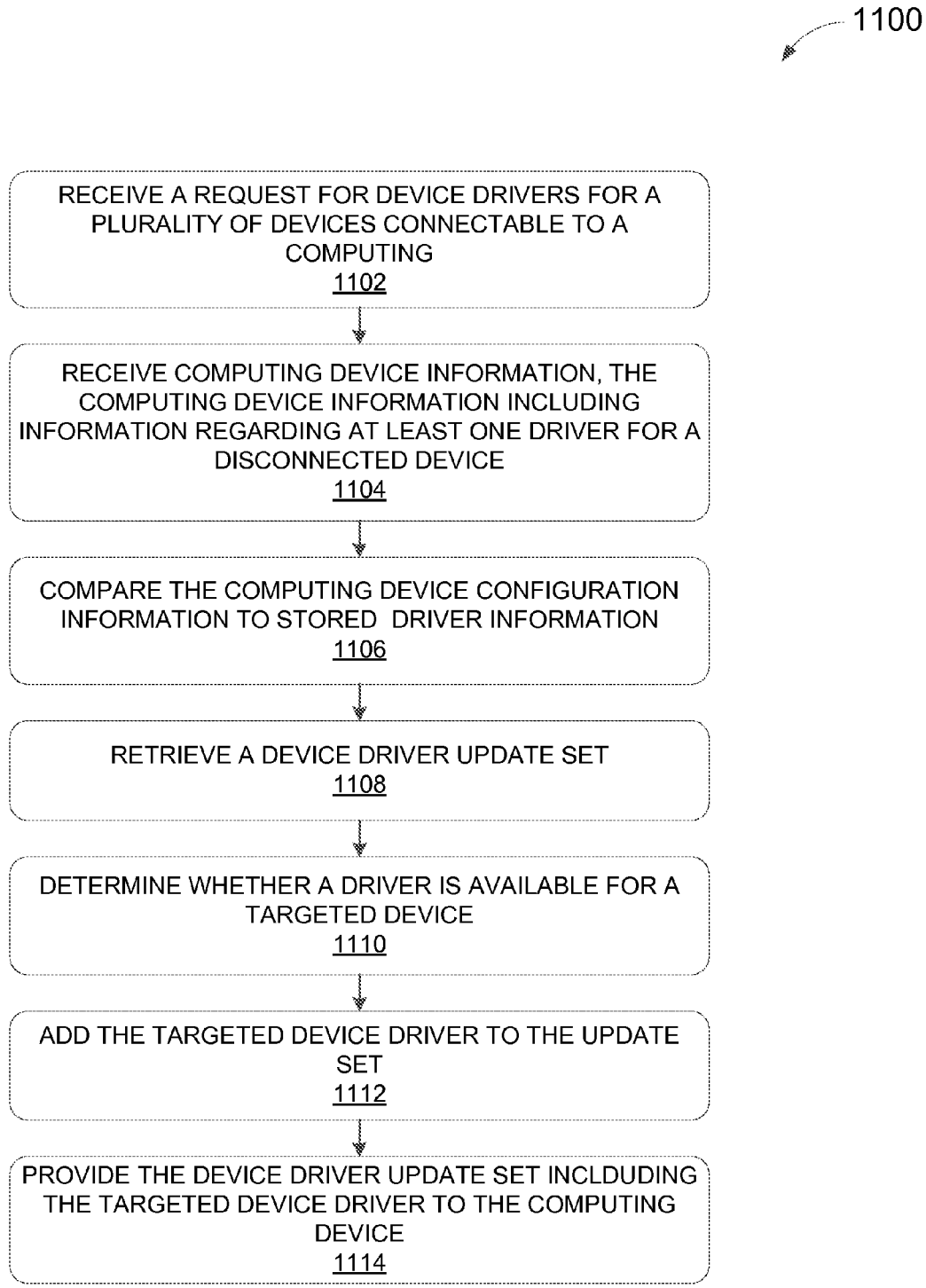
FIG. 11 is an exemplary flow diagram that describes a method in accordance with one or more embodiments.
Figure 12:
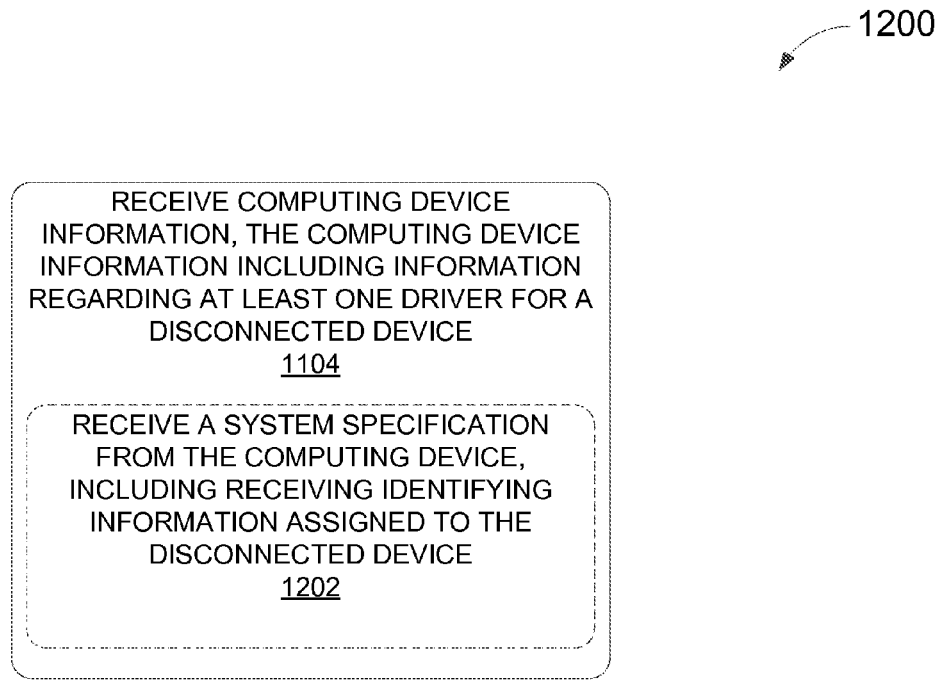
FIG. 12 is an exemplary flow diagram that describes a method in accordance with one or more embodiments.
Figure 13:
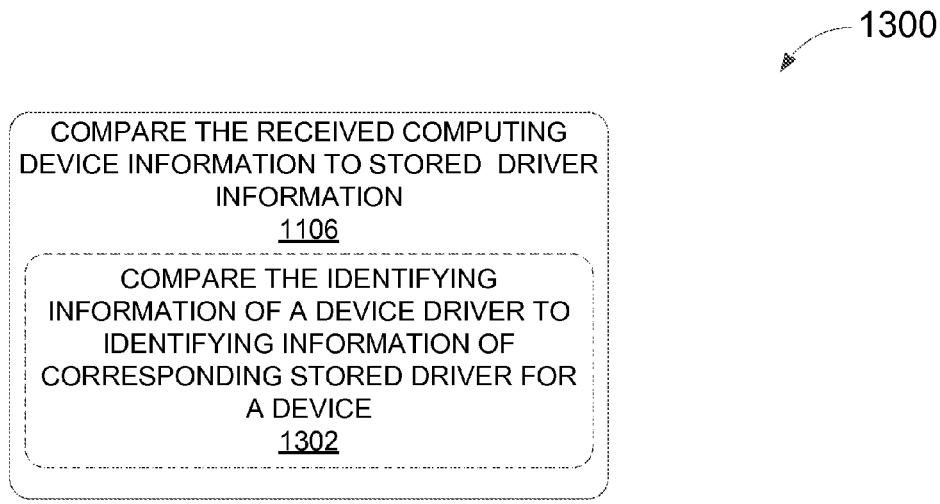
FIG. 13 is an exemplary flow diagram that describes a method in accordance with one or more embodiments.
Figure 14:
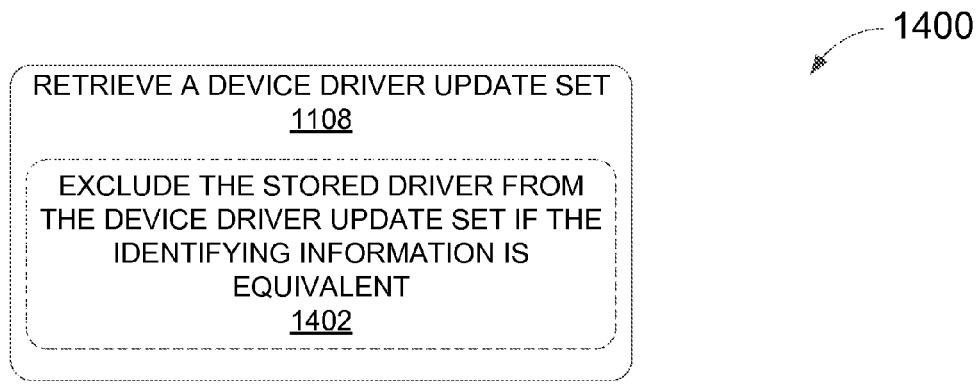
FIG. 14 is an exemplary flow diagram that describes a method in accordance with one or more embodiments.

The discussion below relates to one or more techniques that may be provided, for example, by an update service, such as update service 122. An example embodiment is depicted in FIG. 11, where a method 1100 for managing drivers is depicted. Additional embodiments are depicted in FIGS. 12-15, where methods 1200, 1300, 1400, and 1500 provide optional process operations relating to method 1100. In at least some implementations, the methods describe example techniques for managing device drivers on a computing device.

Method 1100 may begin at operation 1102, where a request for device drivers is received. Referring back to FIGS. 1A and 1B, in some embodiments, a request may be received by an update service 122 from a computing device 102 in the form of a driver update query, as further described above in operation 202 of FIG. 2. Method 1100 may proceed to operation 1104 where computing device information is received. For instance, the update service 122 may receive computing device information from the computing device 102 in a structured format (e.g., as system specification 136 of FIG. 1B, described above). In some embodiments, operation 1104 may further include operation 1202 of method 1200, illustrated in FIG. 12. At operation 1202, receiving computing device information may include receiving a system specification from the computing device. For instance, the computing device information may be information described in the system specification 136 (e.g., computing device attribute information, device driver information, etc.). The system specification 136 may also include identifying information assigned to one or more device drivers, including at least a disconnected device, as described above. In some embodiments, upon receipt of the system specification 136, the update service 122 may store driver information in a local datastore 126 for use in future checks.

Referring back to FIG. 11, upon receiving the computing device information, method 1100 may proceed to operation 1106, where the computing device information is compared to stored driver information. As described above, if an original driver for a device has previously been installed, an embodiment of the disclosed techniques may request an updated driver for the device from the update service. However, in some instances, the update service 122 may be storing the same version of the driver that is stored on the computing device 102. To obtain updated drivers, the update service 122 may query an update repository (e.g., driver store 124) to locate available updates applicable to the drivers in the received system specification (e.g., currently present devices, previously connected but currently disconnected devices and/or targeted drivers). For an available driver, a driver comparison may be performed to determine if an available driver is more current than an installed driver, or applies more specifically to the associated device. Information passed to the update service 122 in the system specification may be utilized by the update service to determine if a better driver than the installed driver is available.

In some embodiments, the update service 122 may utilize the received information to identify and ascertain the need for newer or more specific drivers and send a response back to the computing device 102. Utilizing the information contained therein, the update service 122 may review the system specification 136 of the computing device 102 to correctly correlate device identifications with installed and/or needed drivers. The update service 122 may then evaluate the devices and drivers, and determine whether a more current or more specific version of each driver is available (or retrievable from a driver publisher 128). In some embodiments, to perform the comparison, a matching optimization algorithm may be utilized by the update service 122 to examine an internal database of drivers in order to find appropriate drivers for the computing device 122. For each device in the list, the update service 122 may evaluate the drivers that have been published on the update service 122 for that device, and calculate whether any of drivers available from the update service 122 are newer, more specific, or otherwise more appropriate than the driver listed in the system specification 136 using the matching optimization algorithm. The algorithm may be configured to accept as inputs at least one of version numbering, publication dates, hardware device identifiers (such as PnP hardware IDs or compatible IDs), or other ranking information. Specifically, if an appropriate driver is not found, or if the computing device 102 already has the most current and applicable driver, an appropriate indication of the condition may be included in the update set 138 and passed on to the computing device 102.

It is contemplated that the update service 122 may be storing the same version of a device driver that is received in the list. To avoid redundant installation of the same driver version, operation 1106 may further include operation 1302 of method 1300, illustrated in FIG. 13. At operation 1302, identifying information assigned to a driver in the list (as illustrated in FIG. 1B and described above) may be compared to driver information stored at the update service. For instance, a device driver identifying number of a driver in a received system specification may be compared to a device driver identifying number of a corresponding device driver stored on the update service 122. In some instances, the device driver identifying number identifies a version of the device driver. It is further contemplated that other device driver identifying information may be utilized for the comparison.

Referring back to FIG. 11, if updates are available, method 1100 may proceed to operation 1108, where a device driver update set is retrieved. In some embodiments, if an update is available, the update service 122 may gather the update set and driver information and configure the update set and information for transmission to the computing device. For instance, if an update is found for one or more drivers, the update service may build an update set 138 including updated drivers and driver information and configure the update set 138 for download to the computing device 102. In one embodiment, the associated driver files including corresponding information file supporting the device are collected and added to the update set 138. The device driver update set 138 may include at least one updated driver for a disconnected device.

As mentioned above, operation 1108 may further include operation 1402 of method 1400, where a driver information comparison may be performed. If a driver version stored on the update service 122 matches a driver version received in the system specification 136, the driver may be excluded from a list of updates provided by the update service, as is described below. At operation 1402, the device driver may be excluded from the update set.

Figure 15:
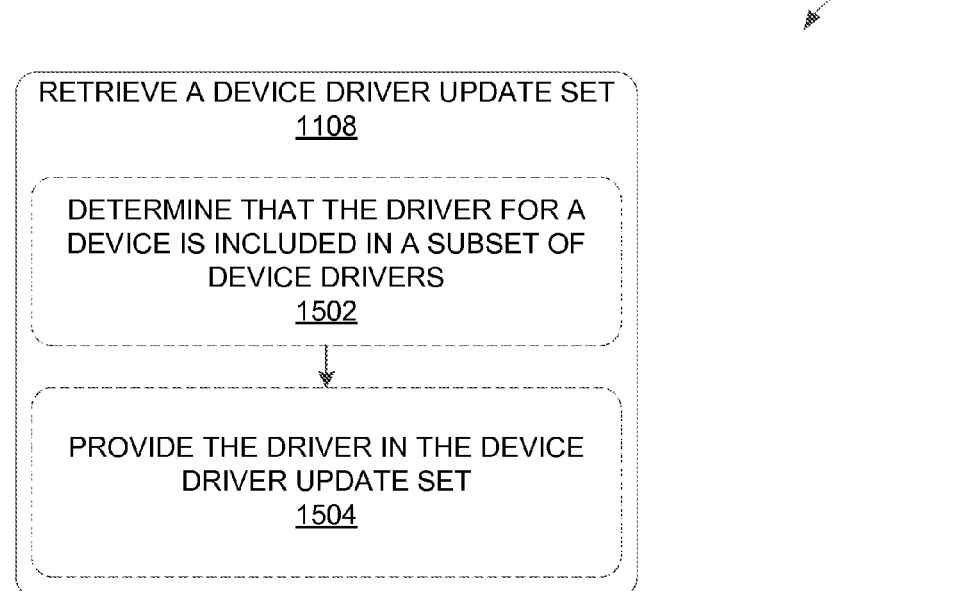
FIG. 15 is an exemplary flow diagram that describes a method in accordance with one or more embodiments.

As further described above, operation 1108 may alternatively include operations 1502 and 1504 of method 1500, illustrated in FIG. 15. It is contemplated that a driver that would otherwise be excluded from an update set may be a member of an update subset, as described above. In these instances, the driver may be included in the update set. At operation 1502, a determination may be made that the driver is part of an update subset. Upon making this determination, method 1500 may proceed to operation 1504, where the driver may be included in the update set. If an update is included in an update is part of an update subset, the update service 122 may provide instructions to the computing device 102 relating to the installation of the subset. The instructions may include that each driver in the subset is to be installed on the computing device 102. If the computing device 102 is unable to install each driver, the update service may send instructions to the computing device not to install any of the drivers in the update subset.

As would be understood by one skilled in the art, the operations and procedures described herein for updating a driver may also be applied to obtain a driver that has never been connected to the computing device. Thus, method 1100 may proceed to operation 1110, where a determination that a driver for a targeted device is available. In some embodiments, the update service 122 may perform a targeted driver check at the same time as a performing determining an update set for connected or previously connected devices. The disclosure further provides that the update service 122 may be configured to selectively distribute drivers to machines with particular hardware configurations, even if the associated devices have not previously been connected to the computing device. The targeted device driver may be retrieved and included in the update set 138. In some embodiments, targeted drivers for targeted devices may be designated as members of an update subset targeted at the hardware configuration of the computing device 102. To provide a targeted device driver, the update service 122 may determine if any targeted device drivers included in the list of known targeted devices are available to download. The update service 122 may also determine whether there are any drivers for targeted devices applicable to the computing device that are not included in the list of known drivers supplied by the computing device 102. Specifically, drivers may also be designated on the update service 122 as eligible for download and install on a computing device even if the update service 122 does not receive device or driver information for the device from the computing device 102 (e.g., because the driver or targeted device unknown to the computing device 102). In some instances, a targeted driver or update (e.g., driver 106c) may be pushed from the driver publisher 128 to the update service 122 with an indication that computing devices with a particular operating system and/or hardware configuration are to receive the pushed update. Alternatively, the update service 122 may determine whether a computing device receives a targeted driver update based on a similar analysis of the computing device operating system and/or hardware configuration. As depicted in FIG. 1B, a new device driver (driver 10 1150) may be stored on the update service (or retrieved from an update publisher 128). If a targeted driver is available, method 1100 may proceed to operation 1112, where the targeted driver is added to the update set. For instance, the update service 122 may gather one or more targeted drivers and corresponding driver information to be added to the update set.

Upon gathering the relevant updates into an update set, method 1100 may further proceed to operation 1114, where the device driver update set is provided to the computing device. The update service 122 may return the update set including one or more targeted drivers to the computing device. The update service 122 may then notify the driver manager 110 of these drivers, and provide the information needed to download and install them to the computing device 102. As previously discussed, depending on the particular computing device utility or application that is interacting with the update server, operation 1114 may include the return of the metadata for specific matching drivers. In one embodiment, the response may be in the form of a set of metadata or a set of locations where identified drivers can be downloaded. In another embodiment, the response may be the metadata for a single matching driver for requested device. Instructions to the computing device 102 may also be provided for storing the new targeted device driver (e.g., in the driver store 120). As discussed above, the computing device 102 may then utilize the information in a manner that is consistent with the computing device application or utility.

A number of methods and systems may be implemented to perform the techniques discussed herein. Aspects of the methods and systems may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100 or other computing environments.

Techniques for installing and updating device drivers are described. Although embodiments are described in language specific to structural features and/or methodological acts, it is to be understood that the embodiments defined in the appended claims are not necessarily limited to the specific features or acts described above. Rather, the specific features and acts are disclosed as example forms of implementing the claimed embodiments.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 16:
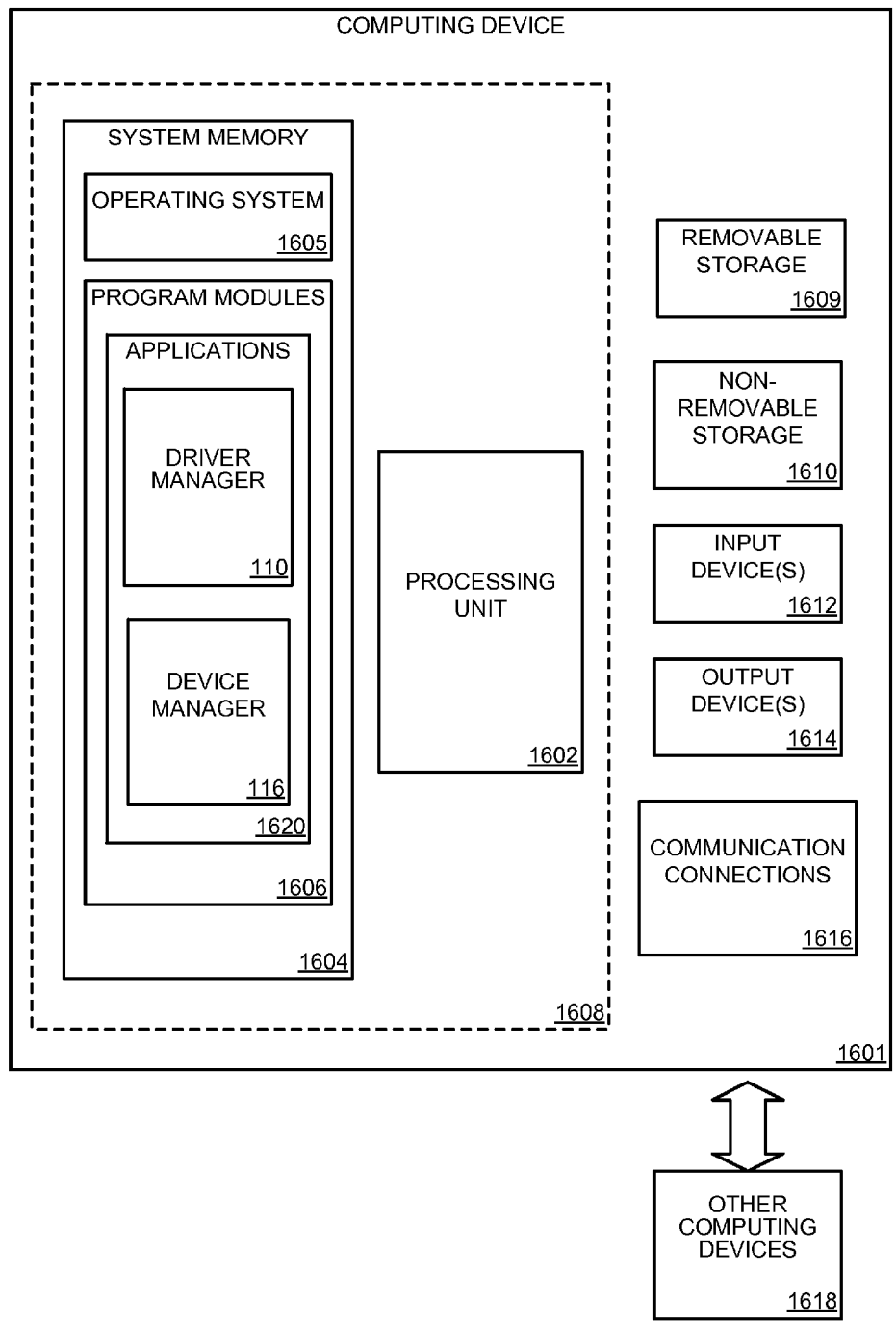
FIG. 16 is a block diagram illustrating example physical components of a computing device with which embodiments of the invention may be practiced.
Figure 17A:
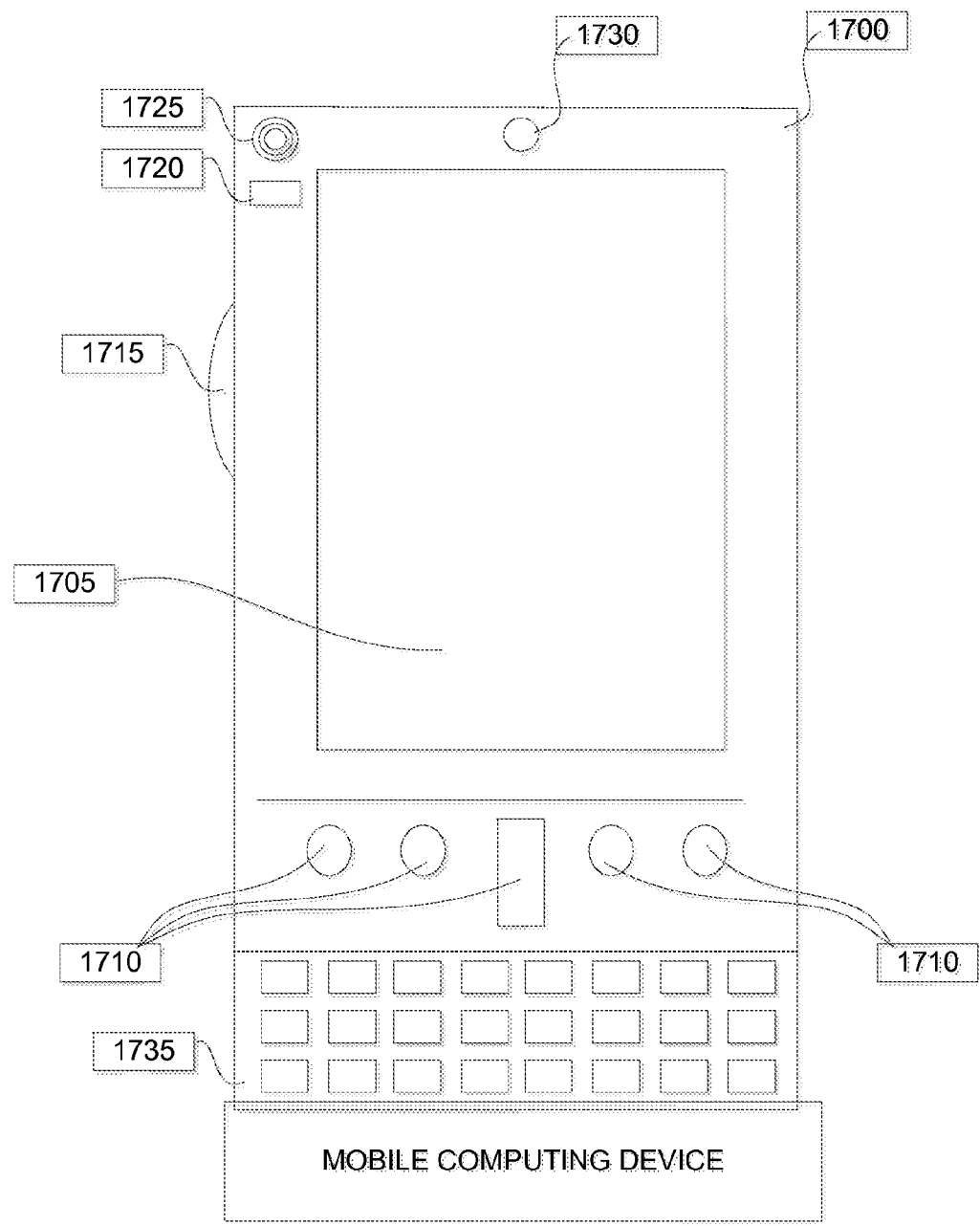
FIGS. 17A and 17B are simplified block diagrams of a mobile computing device with which embodiments of the present invention may be practiced.
Figure 17B:
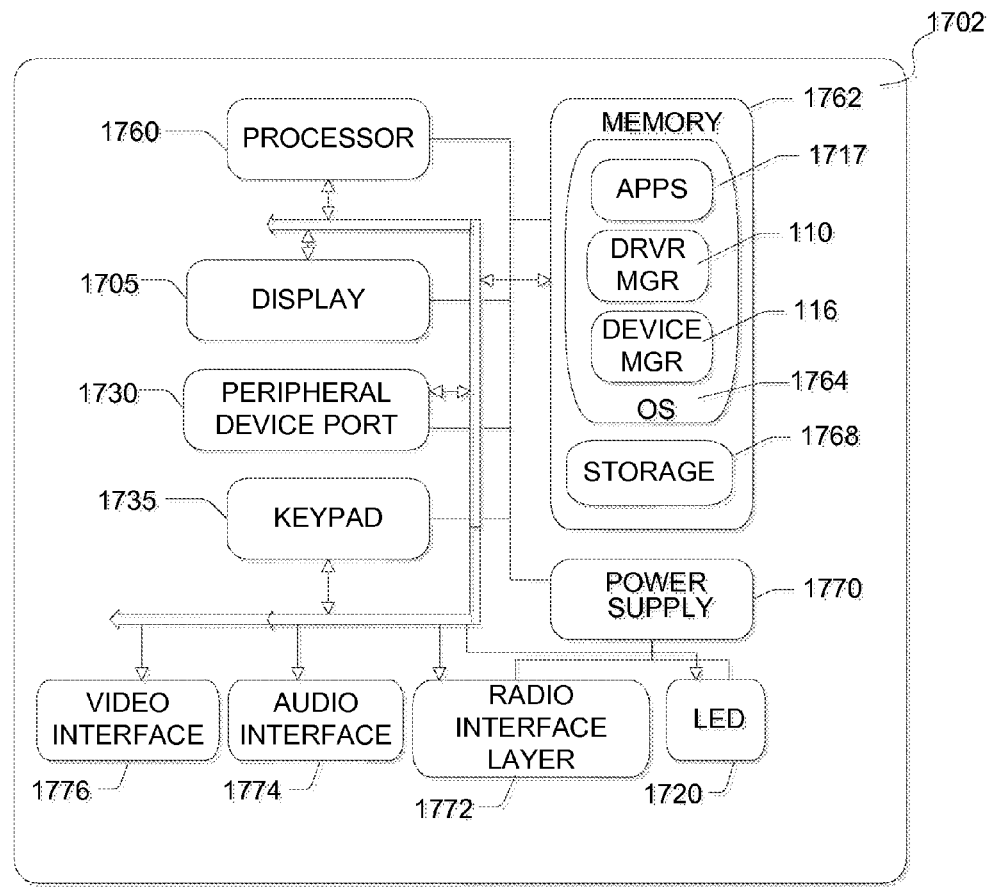
Figure 18:
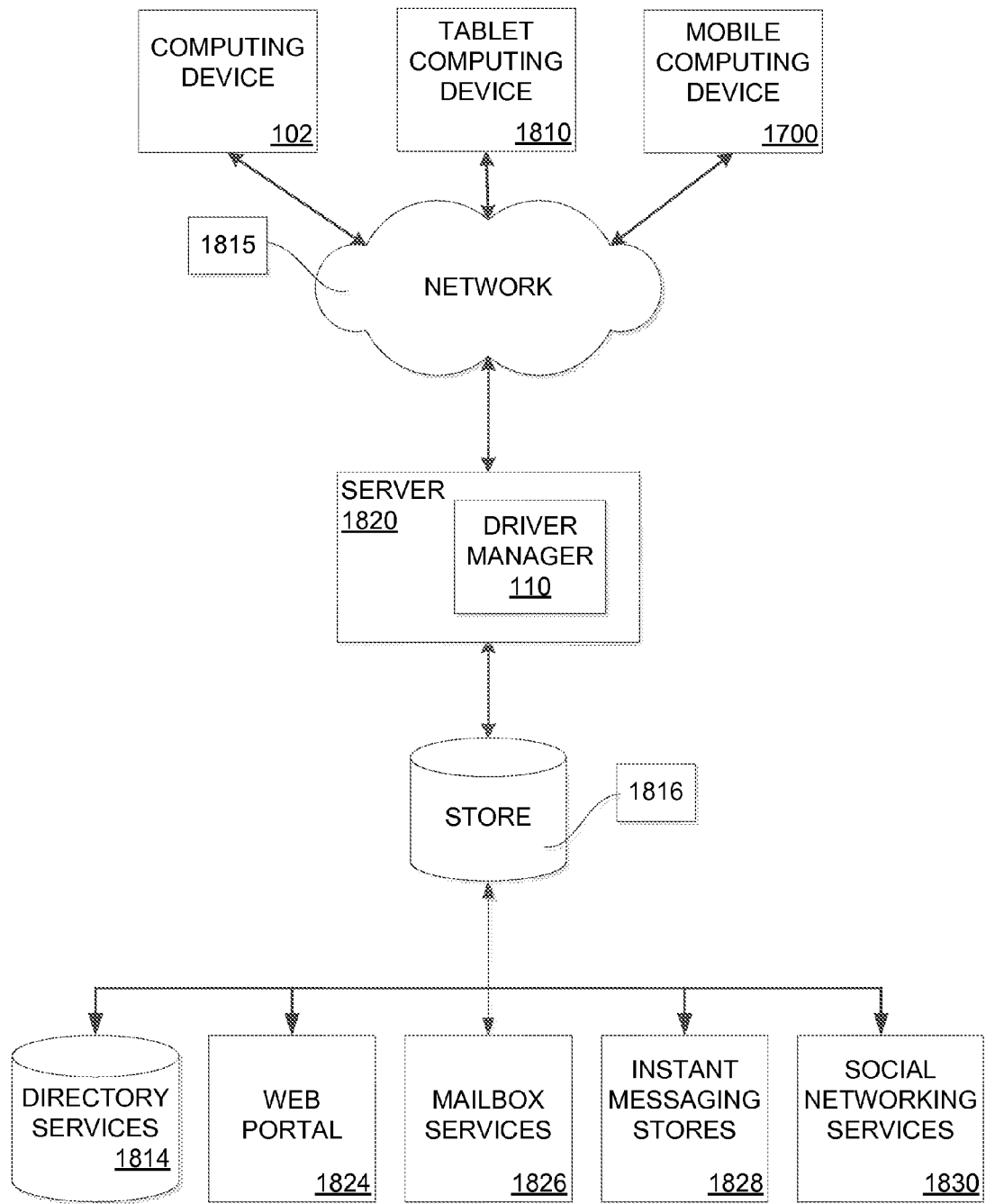
FIG. 18 is a simplified block diagram of a distributed computing system in which embodiments of the present invention may be practiced.

FIGS. 16-18 and the associated descriptions provide a discussion of a variety of operating environments in which embodiments of the invention may be practiced. However, the devices and systems illustrated and discussed with respect to FIG. 16-18 are for purposes of example and illustration and are not limiting of a vast number of computing device configurations that may be utilized for practicing embodiments of the invention, described herein.

FIG. 16 is a block diagram illustrating physical components (i.e., hardware) of a computing device 1601 with which embodiments of the invention may be practiced, including computing device 102, update service 122, and driver publisher 128. The computing device components described below may be suitable for the computing devices described above. In a basic configuration, the computing device 1601 may include at least one processing unit 1602 and a system memory 1604. Depending on the configuration and type of computing device, the system memory 1604 may comprise, but is not limited to, volatile storage (e.g., random access memory), non-volatile storage (e.g., read-only memory), flash memory, or any combination of such memories. The system memory 1604 may include an operating system 1605 and one or more program modules 1606 suitable for running software applications 1620. For example, when computing device 1601 is used for computing device 102, software applications 1620 may include the driver manager 110 and the device manager 116. The operating system 1605, for example, may be suitable for controlling the operation of the computing device 1601. Furthermore, embodiments of the invention may be practiced in conjunction with a graphics library, other operating systems, or any other application program and is not limited to any particular application or system. This basic configuration is illustrated in FIG. 16 by those components within a dashed line 1608. The computing device 1601 may have additional features or functionality. For example, the computing device 1601 may also include additional data storage devices (removable and/or non-removable) such as, for example, magnetic disks, optical disks, or tape. Such additional storage is illustrated in FIG. 16 by a removable storage device 1609 and a non-removable storage device 1610.

As stated above, a number of program modules and data files may be stored in the system memory 1604. While executing on the processing unit 1602, the program modules 1606 may perform processes including, but not limited to, one or more of the stages of the method 200 illustrated in FIG. 2 or method 1100 of FIG. 11. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 16 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, may be operated via application-specific logic integrated with other components of the computing device 1601 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1601 may also have one or more input device(s) 1612 such as a keyboard, a mouse, a pen, a sound input device, a touch input device, etc. The output device(s) 1614 such as a display, speakers, a printer, etc. may also be included. The aforementioned devices are examples and others may be used. The computing device 1601 may include one or more communication connections 1616 allowing communications with other computing devices 1618. Examples of suitable communication connections 1616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1604, the removable storage device 1609, and the non-removable storage device 1610 are all computer storage media examples (i.e., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1601.

Any such computer storage media may be part of the computing device 1601. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 17A and 17B illustrate a mobile computing device 1700, for example, a mobile telephone, a smart phone, a tablet personal computer 1810, a laptop computer, and the like, with which embodiments of the invention may be practiced, including computing device 102, update service 122, and driver publisher 128. With reference to FIG. 17A, one embodiment of a mobile computing device 1700 for implementing the embodiments is illustrated. In a basic configuration, the mobile computing device 1700 is a handheld computer having both input elements and output elements. The mobile computing device 1700 typically includes a display 1705 and one or more input buttons 1710 that allow the user to enter information into the mobile computing device 1700. The display 1705 of the mobile computing device 1700 may also function as an input device (e.g., a touch screen display). If included, an optional side input element 1715 allows further user input. The side input element 1715 may be a rotary switch, a button, or any other type of manual input element. In alternative embodiments, mobile computing device 1700 may incorporate more or less input elements. For example, the display 1705 may not be a touch screen in some embodiments. In yet another alternative embodiment, the mobile computing device 1700 is a portable phone system, such as a cellular phone. The mobile computing device 1700 may also include an optional keypad 1735. Optional keypad 1735 may be a physical keypad or a "soft" keypad generated on the touch screen display. In various embodiments, the output elements include the display 1705 for showing a graphical user interface (GUI), a visual indicator 1720 (e.g., a light emitting diode), and/or an audio transducer 1725 (e.g., a speaker). In some embodiments, the mobile computing device 1700 incorporates a vibration transducer for providing the user with tactile feedback. In yet another embodiment, the mobile computing device 1700 incorporates input and/or output ports, such as an audio input (e.g., a microphone jack), an audio output (e.g., a headphone jack), and a video output (e.g., a HDMI port) for sending signals to or receiving signals from an external device.

FIG. 17B is a block diagram illustrating the architecture of one embodiment of a mobile computing device. That is, the mobile computing device 1700 can incorporate a system (i.e., an architecture) 1702 to implement some embodiments. In one embodiment, the system 1702 is implemented as a "smart phone" capable of running one or more applications (e.g., browser, e-mail, calendaring, contact managers, messaging clients, games, and media clients/players). In some embodiments, the system 1702 is integrated as a computing device, such as an integrated personal digital assistant (PDA) and wireless phone.

One or more application programs 1717 may be loaded into the memory 1762 and run on or in association with the operating system 1764. Examples of the application programs include phone dialer programs, e-mail programs, personal information management (PIM) programs, word processing programs, spreadsheet programs, Internet browser programs, messaging programs, and so forth. The system 1702 also includes a non-volatile storage area 1768 within the memory 1762. The non-volatile storage area 1768 may be used to store persistent information that should not be lost if the system 1702 is powered down. The application programs 1717 may use and store information in the non-volatile storage area 1768, such as e-mail or other messages used by an e-mail application, and the like. A synchronization application (not shown) also resides on the system 1702 and is programmed to interact with a corresponding synchronization application resident on a host computer to keep the information stored in the non-volatile storage area 1768 synchronized with corresponding information stored at the host computer. As should be appreciated, other applications may be loaded into the memory 1762 and run on the mobile computing device 1700, including, when computing device 102 is implemented as mobile computing device 1700, the driver manager 110 and the device manager 116 described herein.

The system 1702 has a power supply 1770, which may be implemented as one or more batteries. The power supply 1770 might further include an external power source, such as an AC adapter or a powered docking cradle that supplements or recharges the batteries.

The system 1702 may also include a radio 1772 that performs the function of transmitting and receiving radio frequency communications. The radio 1772 facilitates wireless connectivity between the system 1702 and the "outside world," via a communications carrier or service provider. Transmissions to and from the radio 1772 are conducted under control of the operating system 1764. In other words, communications received by the radio 1772 may be disseminated to the application programs 1717 via the operating system 1764, and vice versa.

The visual indicator 1720 may be used to provide visual notifications, and/or an audio interface 1774 may be used for producing audible notifications via the audio transducer 1725. In the illustrated embodiment, the visual indicator 1720 is a light emitting diode (LED) and the audio transducer 1725 is a speaker. These devices may be directly coupled to the power supply 1770 so that when activated, they remain on for a duration dictated by the notification mechanism even though the processor 1760 and other components might shut down for conserving battery power. The LED may be programmed to remain on indefinitely until the user takes action to indicate the powered-on status of the device. The audio interface 1774 is used to provide audible signals to and receive audible signals from the user. For example, in addition to being coupled to the audio transducer 1725, the audio interface 1774 may also be coupled to a microphone to receive audible input, such as to facilitate a telephone conversation. In accordance with embodiments of the present invention, the microphone may also serve as an audio sensor to facilitate control of notifications, as will be described below. The system 1702 may further include a video interface 1776 that enables an operation of an on-board camera 1730 to record still images, video stream, and the like.

A mobile computing device 1700 implementing the system 1702 may have additional features or functionality. For example, the mobile computing device 1700 may also include additional data storage devices (removable and/or non-removable) such as, magnetic disks, optical disks, or tape. Such additional storage is illustrated in FIG. 17B by the non-volatile storage area 1768.

Data/information generated or captured by the mobile computing device 1700 and stored via the system 1702 may be stored locally on the mobile computing device 1700, as described above, or the data may be stored on any number of storage media that may be accessed by the device via the radio 1772 or via a wired connection between the mobile computing device 1700 and a separate computing device associated with the mobile computing device 1700, for example, a server computer in a distributed computing network, such as the Internet. As should be appreciated such data/information may be accessed via the mobile computing device 1700 via the radio 1772 or via a distributed computing network. Similarly, such data/information may be readily transferred between computing devices for storage and use according to well-known data/information transfer and storage means, including electronic mail and collaborative data/information sharing systems.

FIG. 18 illustrates one embodiment of the architecture of a system for managing device driver updates, as described above. Drivers managed with the driver manager 110 and/or the device manager 116 may be stored in different communication channels or other storage types. For example, various documents may be stored using a directory service 1814, a web portal 1824, a mailbox service 1826, an instant messaging store 1828, or a social networking site 1830. The driver manager 110 and/or the device manager 116 may use any of these types of systems or the like for enabling data utilization, as described herein. A server 1820 may provide the driver manager 110 and/or the device manager 116 to clients. As one example, the server 1820 may be a web server providing the driver manager 110 over the web. The server 1820 may provide the driver manager 110 and/or the device manager 116 over the web to clients through a network 1815. By way of example, the client computing device may be implemented as the computing device 102 and embodied in a personal computer, a tablet computing device 1810 and/or a mobile computing device 1700 (e.g., a smart phone). Any of these embodiments of the client computing device 102, 1810, 1700 may obtain content from the store 1816.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A computer-implemented method for managing device drivers comprising:
   requesting one or more drivers for one or more devices connectable to a computing device, wherein the requested one or more device drivers includes a first driver for a disconnected device, wherein the disconnected device is a device that was previously connected and is disconnected from the computing device at the time of the request;
   receiving a device driver update set, the update set including at least the first driver and a second driver for a new device, wherein the new device is a device that has not previously been connected to the computing device;
   installing the first driver and the second driver on the computing device; and
   configuring the first driver to activate when the disconnected device is detected by the computing device.

2. The computer-implemented method of claim 1, wherein requesting a device driver update set comprises:
   compiling a list of device drivers stored on the computing device, wherein the list includes at least the disconnected device driver and a second device driver and further includes disconnected device driver version information and second device driver version information; and
   creating a system specification including at least the list of stored device drivers.

3. The computer-implemented method of claim 2, further comprising:
   determining one or more computing device attributes; and
   inserting the one or more computing device attributes into the system specification.

4. The computer-implemented method of claim 3, further comprising:
   sending the system specification to an update service.

5. The computer-implemented method of claim 4, further comprising:
   receiving, as part of the update set, a driver subset, wherein the driver subset includes two or more drivers and instructions to install the two or more drivers together;
   receiving, as part of the driver subset, a driver for the second device and corresponding device driver version information, wherein received corresponding device driver version information is equivalent to the second device driver version information included in the list of device drivers; and
   installing the second device driver.

6. The computer-implemented method of claim 4, further comprising:
   receiving, with the update set, at least one new driver for a device that has not previously been connected to the computing device and instructions to install the at least one new driver.

7. The computer-implemented method of claim 2, wherein compiling a list of device drivers comprises:
   determining a length of time a second disconnected device has been disconnected from the computing device; and
   excluding a driver associated with the second disconnected device from the list of device drivers if the disconnection time exceeds a predetermined maximum length of disconnection time.

8. The computer-implemented method of claim 7, further comprising:
   receiving an updated second disconnected device driver as part of a subset of related device drivers along with the disconnected device driver; and
   installing the updated second disconnected device driver.

9. The computer-implemented method of claim 1, wherein installing the at least one driver on the computing device further comprises:
   installing a current metadata package describing the disconnected device; and
   installing at least one application, wherein the at least one application is capable of interfacing with the disconnected device when the disconnected device reconnects to the computing device.

10. The computer-implemented method of claim 1, further comprising:
   upon installing the at least one driver, removing a corresponding previous driver version from the computing device.

11. A computer-readable storage medium storing instructions for managing device drivers, the instructions, when executed, causing a computing device to perform a method, the method comprising:
   requesting, from an update service, one or more drivers for one or more devices connectable to a computing device further including:
      compiling a list of device drivers stored on the computing device, wherein the list includes at least a disconnected device driver and a second device driver and further includes disconnected device driver version information and second device driver version information, wherein the disconnected device is a device that was previously connected and is disconnected from the computing device at the time of the request;
      determining one or more computing device attributes;
      sending the computing device attributes and the list of device drivers to the update service;
   receiving, from the update service, a device driver update set, wherein at least one driver in the update set is a driver for the disconnected device;
   installing the at least one driver for the disconnected device on the computing device; and
   configuring the at least one driver for the disconnected device to activate when the disconnected device is detected by the computing device.

12. The computer-readable storage medium of claim 11, the method caused by the instructions further comprising:
   receiving, with the update set, at least one new driver for a device that has not previously been connected to the computing device and instructions to install the at least one new driver.

13. The computer-readable storage medium of claim 11, the method caused by the instructions further comprising:
   receiving, as part of the update set, a driver subset, wherein the driver subset includes two or more drivers and instructions to install the two or more drivers together;
   receiving, as part of the driver subset, a driver for the second device and corresponding device driver version information, wherein received corresponding device driver version information is equivalent to the second device driver version information included in the list of device drivers; and
   installing the second device driver only if the disconnected device driver is also installed.

14. The computer-readable storage medium of claim 11, the method caused by the instructions further comprising:
   determining a length of time a second disconnected device has been disconnected from the computing device; and
   excluding a driver associated with the second disconnected device from the list of device drivers if the disconnection time exceeds a predetermined maximum length of disconnection time.

15. The computer-readable storage medium of claim 14, the method caused by the instructions further comprising:
   receiving an updated second disconnected device driver as part of a subset of related device drivers along with the disconnected device driver; and
   installing the updated second disconnected device driver.

16. A computer-implemented method for managing device drivers comprising:
   receiving a request for device driver updates for one or more devices connectable to a computing device;
   receiving computing device configuration information for the computing device, the computing device configuration information including information regarding at least one device driver for a disconnected device, wherein the disconnected device comprises a device that was previously connected and is not connected to the computing device at the time of the request;
   comparing the computing device configuration information to stored driver information;
   retrieving a device driver update set including at least one updated device driver for the disconnected device;
   adding a new device driver to the update set, wherein the new device driver is for a new device that has not previously been connected to the computing device; and
   providing the update set to the computing device.

17. The computer-implemented method of claim 16, wherein receiving computing device configuration information further comprises:
   receiving a list of device drivers stored on the computing device and corresponding device driver information.

18. The computer-implemented method of claim 17, wherein receiving corresponding device driver information further comprises:
   receiving identifying information assigned to the disconnected device and at least a second device driver in the list.

19. The computer-implemented method of claim 18, wherein comparing the computing device configuration information to stored driver information further comprises:
   comparing the received identifying information assigned to the second device driver to identifying information of a corresponding updated driver for the second device; and
   excluding the corresponding updated driver from the device driver update set if the identifying information is equivalent.

20. The computer-implemented method of claim 18, further comprising:
   receiving, in the list, a third device driver and a third device driver identifying information;
   comparing the received third device driver identifying information to identifying information of a corresponding updated driver for the third device;
   determining that the third device driver is included in a subset of device drivers; and
   providing the corresponding updated driver in the device driver update set.

* * * * *